United States Patent
Paron et al.

(10) Patent No.: US 7,979,320 B2
(45) Date of Patent: Jul. 12, 2011

(54) AUTOMATED ACQUISITION AND CONFIGURATION OF GOODS AND SERVICES VIA A NETWORK

(75) Inventors: Dean P. Paron, Bellevue, WA (US);
Huseyin Gok, Redmond, WA (US);
Kevin T. Damour, Bellevue, WA (US);
Leszek Mazur, Bellevue, WA (US);
Lingan Satkunanathan, Kirkland, WA (US); Neil Scott Fishman, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 1137 days.

(21) Appl. No.: 11/464,823

(22) Filed: Aug. 15, 2006

(65) Prior Publication Data

US 2008/0046328 A1 Feb. 21, 2008

(51) Int. Cl.
*G06Q 30/00* (2006.01)
(52) U.S. Cl. .............. 705/26.7; 705/26.1; 705/26.8; 705/26.81; 705/26.82; 705/27.2
(58) Field of Classification Search .............. 705/26, 705/26.1–27.2
See application file for complete search history.

(56) References Cited

U.S. PATENT DOCUMENTS

| | | | |
|---|---|---|---|
| 5,852,722 | A | 12/1998 | Hamilton |
| 6,012,088 | A | 1/2000 | Li et al. |
| 6,233,609 | B1 | 5/2001 | Mittal |
| 6,243,754 | B1 | 6/2001 | Guerin et al. |
| 6,298,341 | B1 | 10/2001 | Mann et al. |
| 6,349,288 | B1 | 2/2002 | Barber |
| 6,487,594 | B1 | 11/2002 | Bahlmann |
| 6,564,342 | B2 | 5/2003 | Landan |
| 6,611,861 | B1 | 8/2003 | Schairer et al. |
| 6,687,746 | B1 | 2/2004 | Shuster et al. |
| 6,701,342 | B1 | 3/2004 | Bartz et al. |
| 6,782,421 | B1 | 8/2004 | Soles et al. |
| 6,823,382 | B2 | 11/2004 | Stone |
| 6,856,820 | B1 | 2/2005 | Kolls |
| 6,880,007 | B1 | 4/2005 | Gardos et al. |
| 6,895,431 | B1 | 5/2005 | Bero |
| 6,961,778 | B2 | 11/2005 | Swartz et al. |

(Continued)

FOREIGN PATENT DOCUMENTS

EP 1 111 840 A2 6/2001

OTHER PUBLICATIONS

Briscoe et al., A Market Managed Multi-service Internet (M3I), Preprint of article in ComputerCommunications 26 (4) (2003) 404-414, Feb. 22, 2003, 22 pages.

(Continued)

*Primary Examiner* — Michael A. Misiaszek
(74) *Attorney, Agent, or Firm* — Klarquist Sparkman, LLP

(57) ABSTRACT

A computer performs a method of communicating with a referral server to identify configurables available to the computer based on the computer's location and at least one other factor. The computer receives a list of provider servers selected by the referral server for referring to the computer because the provider servers on the list auto-configure configurables in the computer's location and according to the at least one other factor. The method communicates with a provider server selected from the list to purchase a selected configurable and to auto-configure the computer's computing environment to operate the selected configurable. The method communicates with the referral server to provide a metric about the provider server's performance during purchase and auto-configure.

19 Claims, 17 Drawing Sheets

U.S. PATENT DOCUMENTS

| | | |
|---|---|---|
| 6,978,270 B1 | 12/2005 | Carty et al. |
| 6,990,525 B1 | 1/2006 | Ying et al. |
| 7,031,951 B2 | 4/2006 | Mancisidor et al. |
| 7,032,241 B1 | 4/2006 | Venkatachary |
| 7,062,451 B1 | 6/2006 | Dentel et al. |
| 7,194,543 B2 | 3/2007 | Robertson et al. |
| 2001/0049638 A1 | 12/2001 | Satoh |
| 2002/0016757 A1 | 2/2002 | Johnson et al. |
| 2002/0116491 A1 | 8/2002 | Boyd et al. |
| 2002/0120554 A1 | 8/2002 | Vega |
| 2002/0120685 A1 | 8/2002 | Srivastava et al. |
| 2002/0133463 A1 | 9/2002 | Curtis et al. |
| 2002/0186826 A1 | 12/2002 | Hsu et al. |
| 2003/0069804 A1 | 4/2003 | Barry et al. |
| 2003/0074438 A1 | 4/2003 | Baldwin et al. |
| 2003/0078852 A1 | 4/2003 | Shoen et al. |
| 2003/0084439 A1 | 5/2003 | Perkins et al. |
| 2003/0120556 A1 | 6/2003 | Rosenbaum et al. |
| 2003/0154123 A1* | 8/2003 | Subbloie et al. ............... 705/11 |
| 2003/0161313 A1 | 8/2003 | Jinmei et al. |
| 2003/0182213 A1 | 9/2003 | Kansal |
| 2003/0182413 A1* | 9/2003 | Allen et al. .................... 709/223 |
| 2003/0191650 A1* | 10/2003 | Turner et al. ...................... 705/1 |
| 2004/0015405 A1* | 1/2004 | Cloutier et al. ................ 705/26 |
| 2004/0015866 A1 | 1/2004 | Estep et al. |
| 2004/0059793 A1 | 3/2004 | Gruber et al. |
| 2004/0167982 A1 | 8/2004 | Cohen et al. |
| 2004/0172465 A1 | 9/2004 | Shuster et al. |
| 2004/0225722 A1 | 11/2004 | Jeong |
| 2004/0267630 A1 | 12/2004 | Au et al. |
| 2005/0013417 A1 | 1/2005 | Zimmers et al. |
| 2005/0021779 A1 | 1/2005 | Ahamed et al. |
| 2005/0021841 A1 | 1/2005 | Yoshimoto |
| 2005/0055686 A1 | 3/2005 | Buban et al. |
| 2005/0102394 A1 | 5/2005 | Loveland |
| 2005/0154652 A1 | 7/2005 | Bezos et al. |
| 2005/0216289 A1 | 9/2005 | Parsons et al. |
| 2006/0020525 A1 | 1/2006 | Borelli et al. |
| 2006/0041496 A1* | 2/2006 | Amin .............................. 705/37 |
| 2006/0041612 A1 | 2/2006 | Doshi et al. |
| 2006/0092861 A1 | 5/2006 | Corday et al. |
| 2006/0101155 A1* | 5/2006 | Damour et al. ............... 709/238 |
| 2006/0129503 A1 | 6/2006 | Roberts et al. |
| 2006/0293024 A1* | 12/2006 | Benco et al. ............... 455/404.2 |
| 2007/0008974 A1 | 1/2007 | Dispensa et al. |
| 2007/0174081 A1* | 7/2007 | Smith et al. ....................... 705/1 |
| 2007/0291650 A1 | 12/2007 | Ormazabal |
| 2008/0071589 A1 | 3/2008 | Laicher |

OTHER PUBLICATIONS

"ISPs," *Full Story—ISPs Consumer Report*, updated Dec. 2005, 9 pages.

Johnson, "Choosing an Internet Service Provider," *Linux Journal*, vol. 1996, Issue 24es, Apr. 1996, 4 pages.

LogicBoxes Announces Automation Software for ICANN Accredited Registrars, http://customer.directi.com/aboutus/news/orderbox, downloaded on Feb. 5, 2006, 1 page.

LogicBoxes Managed DNS, http://www.logicboxes.com/solutions/integrated-products/dns/, downloaded on Feb. 5, 2006, 1 page.

Marshall, "Internet Service Providers: A Method for Selection," *Journal of Industrial Technology*, vol. 15, No. 4, Aug. 1999-Oct. 1999, 5 pages.

"Online Connection," http://www.barkers.org/online/index.html, downloaded from the internet on Aug. 14, 2006, 18 pages.

Reichl et al., "A Practical Review of Pricing and Cost Recovery for Internet Services," *IEW'99: 2nd Internet Economics Workshop*, Berlin, Germany, May 28-29, 1999, 6 pages.

ResellerClub, http://directi.com/businessunits/resellerclub/, downloaded on Feb. 5, 2006, 1 page.

"The Web Pro Pack," http://www.amenworld.com/static/index.php-?pid=296, downloaded on Apr. 28, 2006, 3 pages.

International Search Report and Written Opinion for PCT/US2007/016202 dated Jan. 8, 2008.

* cited by examiner

FIG. 8A

```
<?xml version="1.0" encoding="utf-8" ?>
<wsdl:definitions
xmlns:soap="http://schemas.xmlsoap.org/wsdl/soap/"
xmlns:tns="http://tempstring.org/"
xmlns:s="http://www.w3.org/2001/XMLSchema"
xmlns:wsdl="http://schemas.xmlsoap.org/wsdl/"
targetNamespace="http://tempstring.org/">
<wsdl:types>
  <s:schema elementFormDefault="qualified" targetNamespace="http://tempstring.org/">   ← 802
    <s:element name="GetCountryData">
      <s:complexType>
        <s:sequence>
          <s:element minOccurs="0" maxOccurs="1" name="Country" type="s:string" />   ← 806
        </s:sequence>
      </s:complexType>
    </s:element>
    <s:element name="GetCountryDataResponse">   ← 804
      <s:complexType>
        <s:sequence>
          <s:element minOccurs="0" maxOccurs="1" name="GetCountryDataResult" type="tns:SbsCountryData" />
        </s:sequence>
      </s:complexType>
    </s:element>
    <s:complexType name="SbsCountryData">
      <s:sequence>
        <s:element minOccurs="0" maxOccurs="1" name="Country" type="s:string" />   ← 808
        <s:element minOccurs="0" maxOccurs="1" name="TLDs" type="tns:ArrayOfString" />
        <s:element minOccurs="0" maxOccurs="1" name="Currencies" type="tns:ArrayOfString" />
        <s:element minOccurs="0" maxOccurs="1" name="Languanges" type="tns:ArrayOfString" />
      </s:sequence>
    </s:complexType>
```

FIG. 8B

```
<s:complexType name="ArrayOfString">
  <s:sequence>
    <s:element minOccurs="0" maxOccurs="unbounded" name="string" nillable="true" type="s:string" />
  </s:sequence>
</s:complexType>
<s:element name="GetMarketOffers">     ← 808
  <s:complexType>
    <s:sequence>
      <s:element minOccurs="0" maxOccurs="1" name="CultureName" type="s:string" />    ← 814
    </s:sequence>
  </s:complexType>
</s:element>
<s:element name="GetMarketOffersResponse">     ← 812
  <s:complexType>
    <s:sequence>
      <s:element minOccurs="0" maxOccurs="1" name="GetMarketOffersResult" type="tns:SbsMarketOffers" />
    </s:sequence>
  </s:complexType>
</s:element>
<s:complexType name="SbsMarketOffers">
  <s:sequence>
    <s:element minOccurs="0" maxOccurs="1" name="CultureName" type="s:string" />
    <s:element minOccurs="0" maxOccurs="1" name="Registrars" type="tns:ArrayOfRegistrar" />    ← 816
    <s:element minOccurs="0" maxOccurs="1" name="Offers" type="tns:ArrayOfOffer" />
  </s:sequence>
</s:complexType>
<s:complexType name="ArrayOfRegistrar">
  <s:sequence>
    <s:element minOccurs="0" maxOccurs="unbounded" name="Registrar" nillable="true" type="tns:Registrar" />
  </s:sequence>
</s:complexType>
```

FIG. 8C

```
<s:complexType name="Registrar">
  <s:sequence>
    <s:element minOccurs="0" maxOccurs="1" name="RegistrarName" type="s:string" />    ← 818
    <s:element minOccurs="0" maxOccurs="1" name="Description" type="s:string" />
    <s:element minOccurs="0" maxOccurs="1" name="Base64Icon" type="s:string" />
    <s:element minOccurs="0" maxOccurs="1" name="ConfigurationUrl" type="s:string" />
    <s:element minOccurs="0" maxOccurs="1" name="ServiceUrl" type="s:string" />
  </s:sequence>
</s:complexType>
<s:complexType name="ArrayOfOffer">
  <s:sequence>
    <s:element minOccurs="0" maxOccurs="unbounded" name="Offer" nillable="true" type="tns:Offer" />
  </s:sequence>
</s:complexType>
<s:complexType name="Offer">    ← 820
  <s:sequence>
    <s:element minOccurs="0" maxOccurs="1" name="RegistrarName" type="s:string" />
    <s:element minOccurs="0" maxOccurs="1" name="OfferCode" type="s:string" />
    <s:element minOccurs="0" maxOccurs="1" name="PurchaseUrl" type="s:string" />
    <s:element minOccurs="0" maxOccurs="1" name="TLD" type="s:string" />
    <s:element minOccurs="0" maxOccurs="1" name="Currency" type="s:string" />
    <s:element minOccurs="0" maxOccurs="1" name="Description" type="s:string" />
  </s:sequence>
</s:complexType>
<s:element name="AuditRegistrarSelection">    ← 822
  <s:complexType>
    <s:sequence>
      <s:element minOccurs="0" maxOccurs="1" name="RegistrarName" type="s:string" />
      <s:element minOccurs="1" maxOccurs="1" name="ListPosition" type="s:unsignedInt" />    ← 826
    </s:sequence>
  </s:complexType>
```

FIG. 8E

```
<s:element minOccurs="1" maxOccurs="1" name="TimeFromPurchaseToLive" type="tns:TimeSpan" />
<s:element minOccurs="1" maxOccurs="1" name="GoingLiveSuccessful" type="s:boolean" />  ← 844
</s:sequence>
</s:complexType>
</s:element>
<s:complexType name="TimeSpan" />
<s:element name="AuditGoingLiveResponse">  ← 842
<s:complexType />
</s:element>
<s:element name="AuditDnsConfigFailure">  ← 846
<s:complexType>
<s:sequence>
<s:element minOccurs="0" maxOccurs="1" name="RegistrarName" type="s:string" />
<s:element minOccurs="1" maxOccurs="1" name="FailureType" type="tns:ConfigFailureType" />
<s:element minOccurs="0" maxOccurs="1" name="FailureInfo" type="s:string" />  ← 850
</s:sequence>
</s:complexType>
</s:element>
<s:simpleType name="ConfigFailureType">
<s:restriction base="s:string">
<s:enumeration value="RegistarFailure" />
<s:enumeration value="NetworkFailure" />
<s:enumeration value="OtherFailure" />
</s:restriction>
</s:simpleType>
<s:element name="AuditDnsConfigFailureResponse">  ← 848
<s:complexType />
</s:element>
</s:schema>
</wsdl:types>
<wsdl:message name="GetCountryDataSoapIn">
```

```
<wsdl:part name="parameters" element="tns:GetCountryData" />
</wsdl:message>
<wsdl:message name="GetCountryDataSoapOut">
<wsdl:part name="parameters" element="tns:GetCountryDataResponse" />
</wsdl:message>
<wsdl:message name="GetMarketOffersSoapIn">
<wsdl:part name="parameters" element="tns:GetMarketOffers" />
</wsdl:message>
<wsdl:message name="GetMarketOffersSoapOut">
<wsdl:part name="parameters" element="tns:GetMarketOffersResponse" />
</wsdl:message>
<wsdl:message name="AuditRegistrarSelectionSoapIn">
<wsdl:part name="parameters" element="tns:AuditRegistrarSelection" />
</wsdl:message>
<wsdl:message name="AuditRegistrarSelectionSoapOut">
<wsdl:part name="parameters" element="tns:AuditRegistrarSelectionResponse" />
</wsdl:message>
<wsdl:message name="AuditInitialPurchaseSoapIn">
<wsdl:part name="parameters" element="tns:AuditInitialPurchase" />
</wsdl:message>
<wsdl:message name="AuditInitialPurchaseSoapOut">
<wsdl:part name="parameters" element="tns:AuditInitialPurchaseResponse" />
</wsdl:message>
<wsdl:message name="AuditInitialConfigSoapIn">
<wsdl:part name="parameters" element="tns:AuditInitialConfig" />
</wsdl:message>
<wsdl:message name="AuditInitialConfigSoapOut">
<wsdl:part name="parameters" element="tns:AuditInitialConfigResponse" />
</wsdl:message>
<wsdl:message name="AuditGoingLiveSoapIn">
<wsdl:part name="parameters" element="tns:AuditGoingLive" />
```

FIG. 8G

```
</wsdl:message>
<wsdl:message name="AuditGoingLiveSoapOut">
<wsdl:part name="parameters" element="tns:AuditGoingLiveResponse" />
</wsdl:message>
<wsdl:message name="AuditDnsConfigFailureSoapIn">
<wsdl:part name="parameters" element="tns:AuditDnsConfigFailure" />
</wsdl:message>
<wsdl:message name="AuditDnsConfigFailureSoapOut">
<wsdl:part name="parameters" element="tns:AuditDnsConfigFailureResponse" />
</wsdl:message>
<wsdl:portType name="ServiceSoap">
<wsdl:operation name="GetCountryData">
<wsdl:input message="tns:GetCountryDataSoapIn" />
<wsdl:output message="tns:GetCountryDataSoapOut" />
</wsdl:operation>
<wsdl:operation name="GetMarketOffers">
<wsdl:input message="tns:GetMarketOffersSoapIn" />
<wsdl:output message="tns:GetMarketOffersSoapOut" />
</wsdl:operation>
<wsdl:operation name="AuditRegistrarSelection">
<wsdl:input message="tns:AuditRegistrarSelectionSoapIn" />
<wsdl:output message="tns:AuditRegistrarSelectionSoapOut" />
</wsdl:operation>
<wsdl:operation name="AuditInitialPurchase">
<wsdl:input message="tns:AuditInitialPurchaseSoapIn" />
<wsdl:output message="tns:AuditInitialPurchaseSoapOut" />
</wsdl:operation>
<wsdl:operation name="AuditInitialConfig">
<wsdl:input message="tns:AuditInitialConfigSoapIn" />
<wsdl:output message="tns:AuditInitialConfigSoapOut" />
</wsdl:operation>
```

```
<wsdl:operation name="AuditGoingLive">
  <wsdl:input message="tns:AuditGoingLiveSoapIn" />
  <wsdl:output message="tns:AuditGoingLiveSoapOut" />
</wsdl:operation>
<wsdl:operation name="AuditDnsConfigFailure">
  <wsdl:input message="tns:AuditDnsConfigFailureSoapIn" />
  <wsdl:output message="tns:AuditDnsConfigFailureSoapOut" />
</wsdl:operation>
</wsdl:portType>
<wsdl:binding name="ServiceSoap" type="tns:ServiceSoap">         ← 854
<soap:binding transport="http://schemas.xmlsoap.org/soap/http" />
<wsdl:operation name="GetCountryData">
<soap:operation soapAction="http://tempstring.org/GetCountryData" style="document" />
  <wsdl:input>
    <soap:body use="literal" />
  </wsdl:input>
  <wsdl:output>
    <soap:body use="literal" />
  </wsdl:output>
</wsdl:operation>
<wsdl:operation name="GetMarketOffers">
<soap:operation soapAction="http://tempstring.org/GetMarketOffers" style="document" />
  <wsdl:input>
    <soap:body use="literal" />
  </wsdl:input>
  <wsdl:output>
    <soap:body use="literal" />
  </wsdl:output>
</wsdl:operation>
<wsdl:operation name="AuditRegistrarSelection">
<soap:operation soapAction="http://tempstring.org/AuditRegistrarSelection" style="document" />
```

```
<wsdl:input>
  <soap:body use="literal" />
</wsdl:input>
<wsdl:output>
  <soap:body use="literal" />
</wsdl:output>
</wsdl:operation>
<wsdl:operation name="AuditInitialPurchase">
<soap:operation soapAction="http://tempstring.org/AuditInitialPurchase" style="document" />
<wsdl:input>
  <soap:body use="literal" />
</wsdl:input>
<wsdl:output>
  <soap:body use="literal" />
</wsdl:output>
</wsdl:operation>
<wsdl:operation name="AuditInitialConfig">
<soap:operation soapAction="http://tempstring.org/AuditInitialConfig" style="document" />
<wsdl:input>
  <soap:body use="literal" />
</wsdl:input>
<wsdl:output>
  <soap:body use="literal" />
</wsdl:output>
</wsdl:operation>
<wsdl:operation name="AuditGoingLive">
<soap:operation soapAction="http://tempstring.org/AuditGoingLive" style="document" />
<wsdl:input>
  <soap:body use="literal" />
</wsdl:input>
<wsdl:output>
```

856

AUTOMATED ACQUISITION AND CONFIGURATION OF GOODS AND SERVICES VIA A NETWORK

TECHNICAL FIELD

The technical field relates generally to automated acquisition and configuration of goods and services via a network.

BACKGROUND

Consider a customer who would like to purchase goods or services. For example, consider a customer who would like to purchase and configure a new domain name for a business server. Without successful initial and on-going attention to these tasks, various services such as email, mobility, and web services may not function.

Often, the small business turns to a technical consultant to purchase and configure the Internet presence from third party vendors. The resulting services do not always meet the small business's needs and the small business may overpay for unnecessary services.

Consider a small business that wants to purchase a new domain name. Suppose the small business is in the entertainment industry, and would prefer to purchase a .tv domain name. Like many small businesses, let us also assume that this small business has an internet protocol (IP) address dynamically assigned by the domain name server (DNS) provider. For this small business to obtain a working Internet presence, the small business must locate a domain name, a dynamic DNS vendor, and an Internet connectivity vendor who can provide the desired bandwidth at the location of the small business' server. The small business may find that one vendor can provide all of these services or that multiple vendors are required to meet these needs.

Once one or more vendors are located, the business owner narrows down the services he needs to buy from the one or more vendors. This can be challenging since vendors offer a wide variety of services such as various top-level-domains (TLD), various bandwidths, and various DNS services, and many of these services are communicated by vendors at the level of understanding of a technical consultant.

After the business owner selects vendors and services, the business owner must properly configure the DNS server with the purchased domain registration so multiple DNS records point to the small business server. Finally, the small business monitors the on-going status of the configured Internet presence and monitors renewal of the purchased services. Maintaining an Internet presence is technically difficult and time consuming and requires initial and on-going configuration.

In another example, consider a customer who wants to purchase goods or services over the Internet that require specific technical decisions or knowledge about a customer's computing environment. Existing Internet browsing proceeds by searching and reviewing search results. The browsing experience proceeds link by link, focused by explicit user search terms intended to identify goods and services that a customer desires. Often, purchasing halts when a customer has limited time or when a customer encounters a difficult technical question about their computing environment.

SUMMARY

Technologies described below provide methods and systems for automated acquisition and configuration of goods and services via a network.

A computer communicates with a referral server to identify goods and or services (i.e., configurables) available to the computer. The referral server provides a list of service providers to the computer based on the computer's location and another factor. The service providers are on the list because they are able to auto-configure configurables for the computer's location and according to the other factor. The other factor may be a top level domain, a human language, an operating system, a hardware port, a globally unique identifier of software, a globally unique identifier of hardware, or a bandwidth quantifier. The computer communicates with a provider server selected from the list in order to purchase a selected configurable and to auto-configure the computer's computing environment to operate the selected configurable. The computer communicates with the referral server to provide a metric about the provider server's performance during purchase and auto-configuration of the selected configurable.

The selected configurables may include hardware shipped to the computer's location and software downloaded to the computer during auto-configuration. The computer may also communicate with the provider server to purchase a second selected configurable and to auto-configure the computer's computing environment to operate the second selected configurable. The computer may obtain a software component from the referral server, and use the software component to communicate with the provider server to purchase and auto-configure a selected configurable.

The computer may communicate with the referral server to request available configurables. The request for configurables may be a request for any configurables available to the computer based upon the computer's location and a technical requirement. The technical requirement or geographical information may be obtained from a user of the computer via interaction with a graphical user interface (GUI) or via the computer's memory without the user's input.

The computer communicates with the provider server according to a web service definition obtained from the referral server. Configurables available to the computer via referral from the referral server include at least one of an Internet server presence, video-on-demand (VOD), voice-over-internet-protocol (VOIP), network storage, a router, a printer, or tax services. The computer communicates a post auto-configure audit report to the referral server.

The claimed subject matter is not limited to implementations that solve disadvantages described above in the background. Additional features and advantages will be made apparent from the following detailed description, which proceeds with reference to the accompanying drawings.

BRIEF DESCRIPTION OF THE DRAWINGS

FIGS. 8A-8J show a web service schema that defines an exemplary message passing protocol between client computers and a referral server.

DETAILED DESCRIPTION

Overview

A three component framework is described for enabling identification, referral, selection, acquisition, and installation of goods and/or services (i.e., configurables) over a network, such as the Internet.

The three component system includes (1) a computer requesting configurables via a network connection, (2) a referral server receiving the computer's request for configurables and referring providers of configurables to the computer, and (3) one or more referred provider servers communicating with the computer to auto-configured a configurable. In one example, the computer is business server residing a business and providing hosting for email, remote access, and other collaborative features that require an Internet presence. In such an example, a referred provider server provides DNS services, secure certificates, secure mail, and or other services useful for an Internet presence (such as anti-spam, anti-virus, etc).

Figure 1:
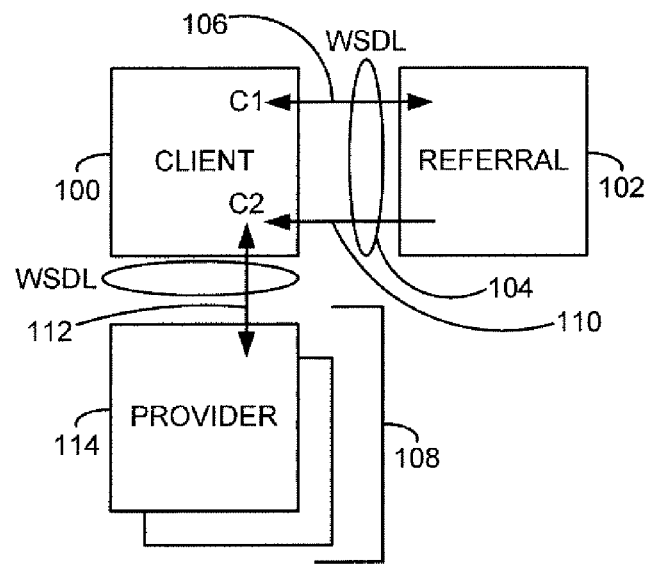
FIG. 1 shows a network framework for an exemplary system for enabling the identification, referral, selection, acquisition, and installation of goods and/or services via a network.

FIG. 1 shows a network framework for an exemplary system for enabling the identification, referral, selection, acquisition, and installation of goods and/or services via a network.

A client computer 100 with software C1 communicates with a referral server 102 according to a protocol 104 (such as HTTP, WSDL, etc). Using the software C1, the client computer communicates 106 with the referral server to enumerate configurable goods and/or services (e.g., configurables). Upon selection of one or more configurables by a user, the client computer communicates 106 with the referral server 102 to identify plural providers 108 of selected configurables. If desirable, a provider of configurables can be selected before a configurable is selected.

Optionally, the client computer 100 communicates 106 to receive software C2 110 specific for communicating with any of the identified plural providers 108 of the selected configurables. Optionally, the client computer 100 communicates 106 with the referral server 102 to identify another server (not shown) with which the client computer 100 may communicate to obtain the software C2.

A list of plural providers of configurables is communicated 106 by the referral server 102 to the client computer 100. A user (not shown) of the client computer 100 may select a provider from the list. The provider is selected to provide a selected configurable.

In the example where the client computer 100 obtains the software C2, the client computer uses the received software C2 to communicate 112 with a selected provider server 114. The client computer 100 communicates 112 with the provider server 114 to automatically configure the selected configurables according to a technical requirement of the client computer 100 environment. In another example, the client computer 100 communicates with the selected provider server 114 using software already existing on the client computer 100, such an HTTP protocol, without obtaining additional communication software C2 identified by the referral server 102.

In one example, the selected configurables (e.g., software, software and hardware, hardware, etc.) are utilized in conjunction with the client computer 100. In such an example, the software C1 on the client computer 100 communicates 106 to collect technical requirements or other limitations at the client computer 100 computing environment, such as bandwidth, operating system version, user's human language, geographical location, network capacity, etc. The referral server 102 communicates 106 with the client computer 100 in order to enumerate configurables specifically available to the client computer 100 computing environment.

Information required to utilize configurables at the computing environment of the client computer 100 will vary greatly based upon the type of configurables (e.g., VOIP, VOD, DNS, domain name sales and service, printers, wireless routers, handwriting recognition software, etc.) and based upon other hardware and software already existing in the client computer 100 computer environment.

The software C1 used to communicate 106 available configurables for the client computer 100 computing environment may vary from the software C2 used to purchase or configure 112 selected configurables.

Thus, the client computer 100 utilizes initial software C1 to communicate 106 to determine what configurables are specifically supported in the client computer's 100 computing environment, and the client computer 100 uses subsequent software C2 to communicate 112 with the selected provider 114 to purchase and auto-configure the selected configurables. The software C1 or C2 may also communicate in an on-going manner. This will be beneficial when an initial configuration will require changes in the future or in an on-going dynamic manner.

In the described example, the initial software C1 existed on the client computer in advance and the configuration software C2 was subsequently obtained. No such requirement exists. The initial software C1 could also have been communicated back to the client computer 100 from the referral server 102 or from another server using another existing protocol. Also, the configuration software C2 could have already been present on the client computer 100.

Referral Server

Each of plural providers 108 provides information to the referral server 102, such as information about configurables they lease, sell, and/or service, communications supported (human languages and computing protocols), currency accepted, etc. Preferably, this information is provided via communications (not shown) between a provider server 108 and a referral server 102, though no such requirement exists. This information is available to the referral server 102 to provide to clients such as the client computer 100.

A user of the client computer 100 selects configurables and the selection is communicated 106 to the referral server 102. Response to receiving a communication 106 indicating selected configurables, the referral server 102 communicates 106 information back to the client computer 100 indicating one or more providers 108 that are capable of providing and auto-configuring the selected configurables for the client computer 100 computing environment. Information about one or more providers capable of providing selected configurables is presented on-screen at the client computer 100, such as via a GUI. Upon selection of a provider by a user via the GUI, the client computer 100 communicates 106 an indication of selected provider to the referral server 102. Additionally, upon selection of the provider via the GUI, the client computer 100 communicates 112 with a provider server 114 of the selected provider.

In one example, the client computer 100 communicates 106 payment for the selected configurables to the referral server 102. In another example, the client computer 100 communicates payment 112 for the selected configurable to the provider server 114. Any Internet payment technique or billing may be used.

Because the software C1 is executing at the client computer 100 computing environment, the software C1 accesses information from the computing environment, technical or otherwise, that a user (not shown) of the client computer 100, may or may not know or understand. Thus, configurables and providers communicated 106 to the client computer 100 are based upon information obtained about the client computer 100 computing environment by the communicating software C1.

Optionally, configuration software C2 auto-configures selected configurables according to information at least in part obtained from the client computer 100 computing environment. Thus, the referral server 102 facilitates a configuration experience that is client computer 100 computing environment information aware. The computing environment information obtained by the software (C1, C2, etc.) is often technically difficult to understand and/or is obtained from the computing environment directly by the software (C1, C2, etc.) thereby saving time for a user of the client computer 100.

The software C1, C2 is not required to be separate or multiple software components. In another example, the software functionality is provided via a single software component. Additionally, the software functionality can be pre-installed on the client computer 100. However, providing software (C1 and/or C2) to the client computer 100 computing environment as needed over a network, supports extensibility. The software C1 and/or C2 can be communicated 110 to the client computer 100 from the referral server 102, the provider server 114, or it can be downloaded by the client computer 100 from elsewhere on a network where identified by the referral server 102, or by the provider server 114.

Domain Names and DNS Services

Domain name services (DNS services) include domain name registration and domain name hosting. Domain name registration, often provided by a registrar, includes top-level-domains supported and private domain name registration. Domain name hosting, often provided by a DNS provider, includes DNS hosting and dynamic DNS support. DNS services may also include certificate services such as secure web (HTTPS) support and secure email support. DNS services also include anti-virus, anti-spam, etc. For each of the above DNS services, a provider server may have currency and languages available in a geographic region.

In one example, a client computer 100 is an on-premise server (such as a business server) accessing a referral server 102 for information about configurables. In one such example, the referral server 102 communicates 106 information about providers 108 of configurables, such as domain names and DNS services. In one example, a referral server 102 is extensible, and other configurables or providers can be added such as tax preparation services, storage back-up, VOIP, VOD, mobile voice services, mobile data services, Internet presence providers, etc. As configurables or providers are added, they are entered into a database(s) accessible by the referral server 102. Of course, communications 112 needed to auto-configure DNS services may vary from communications 112 needed to auto-configure VOIP. Thus, an initial software component C1 identifies configurables available in a specific computing environment of the client computer 100, and a subsequent component C2 auto-configures a selected configurable for the specific computing environment.

Defining Communications with Web Services

In one example, a software component (C1, C2, etc.) is defined using a web service definition language (WSDL). A WSDL document defines how software components communicate. For example, a WSDL document(s) defines how the client computer 100 communicates 106 with either the referral server 102 and/or the provider server 112. In such example, a software component C1 is designed to communicate 106 with the referral server 102 according to a first WSDL document, while a software component C2 is designed to communicate 112 with a provider server 112 according to second WSDL document. A software component C2 that is designed to conduct automatic configuration may vary greatly based upon configurables, configurable industry, etc. Thus, a WSDL document can be used to verify and control a user experience for a configurable and or for an industry.

Thus, a user selecting configurables and/or an auto-configuration provider, is provided a similar experience controlled by a WSDL document regardless of which provider 108 is selected to provide the configurable. Thus, a software component C2 can be used for a selected configurable or industry, regardless of provider selected. Thus, a WSDL document provides a mechanism that a referral server 102 can use to control how a provider server 114 communicates with the client computer 100. A software component C2 that is WSDL compliant, controls user experience across a set of providers.

By defining and or providing 110 a software component C2, DNS purchasing and or configuration can be managed by a referral server 102. A consistent user experience is provided, regardless of which provider is selected. For example, a referral defined WSDL allows participating providers to offer standard periods of time for domain name purchase, so price comparisons are relative. Or, a WSDL definition may require certain functionality such as automated customer support functions.

Configuration Software

A general embodiment uses referral server(s) communicating with plural provider servers and plural client computers, according to any protocol. Upon selecting a configurable (s) and or a configurable provider, configuring software is used to automatically adapt the selected configurable for the client computing environment. Configuring software may be present on the selecting client computer, or it may be downloaded to the selecting client computer directly from the referral server or pulled from a network location identified to the client computer by the referral server.

Thus, a boot strap download is enabled by the referral server so the configurables can be specifically adapted to the client computing environment. The configuration software is bootstrapped to the client computer and performs the configuration according to specific technical requirements of the client computing environment, where the technical requirements are dynamically and automatically determined and configured as the configuration software executes in the client computing environment.

The configuration software may communicate with the provider server to report the computing environment conditions and to receive configuration directives. The configuration software will typically load executable software, set directory settings, set IP addresses, and etc. The configuration software may also set up sockets, communications links, settings and protocols for sending and receiving e-mail, VOIP, VOD, etc., both at the client computing environment and often, if required, at the provider server. In one example, the configuration software is designed to communicate according to a standardized WSDL document or schema.

Client Computing Environment Specific Referrals

In one example, configurables available in a client computing environment are based upon specific technical or regional conditions of the client computing environment. For example, configurables offered via a referral server are provided to the client computing environment based upon a client's price, location, and/or operating service (OS) requirements/limitations, bandwidth available, human language, currency, country, hardware requirements, etc. Some of this information may be discovered based on user input, and other may be gathered automatically by the software running at the client computer and reported to the referral server during communications.

A computer user may be unaware of limitations or requirements of a computing environment. Software communicating at the client computing environment provides technical aspects to a referral server about the computing environment, such as a computer's geographic location, operating service version/requirements/limitations, bandwidth requirements/limitations, human language, currency, country, network protocols, existing software present, existing hardware present, hardware requirements, software globally unique identifier, hardware globally unique hardware, etc. Thus, when configurables or providers are offered to the user via the referral server, it is known both that the configurables meet the technical aspects of the client computing environment, but also that the list of returned providers can provide configurables that satisfy any specified user features and technical aspects in the computing environment, whether or not a computer user understand the technical aspects. Additionally, if required, the configuration software prepares the computing environment for the selected configurables.

In one example, once a user of the client computer selects a referred provider, steps to enable a selected configurable are provided by configuration software boot strapped to the client computing environment. Additionally, in some cases, such as when the configurables can be downloaded to a client computer 100, the configuration software C2, downloads and configure the configurables.

Figure 8D:
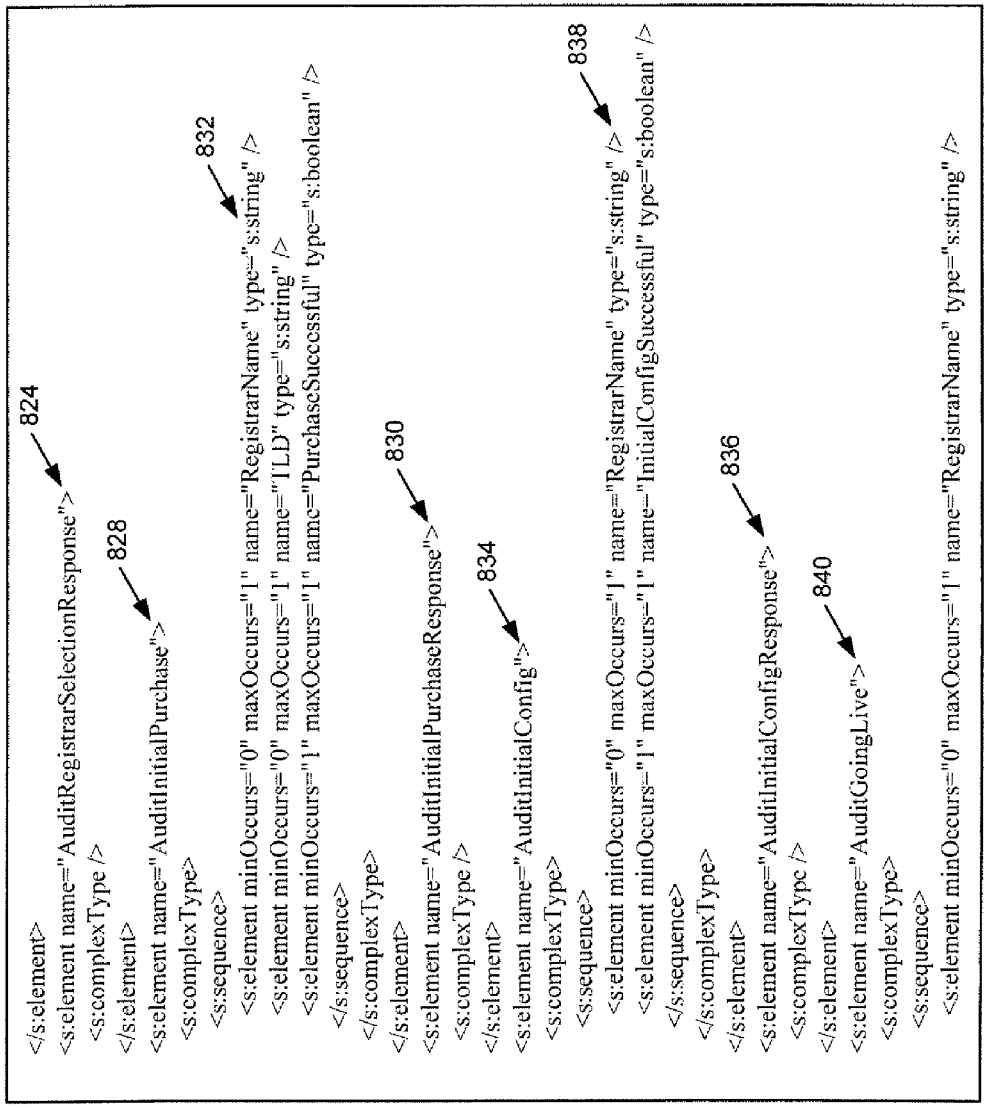
Figure 8J:
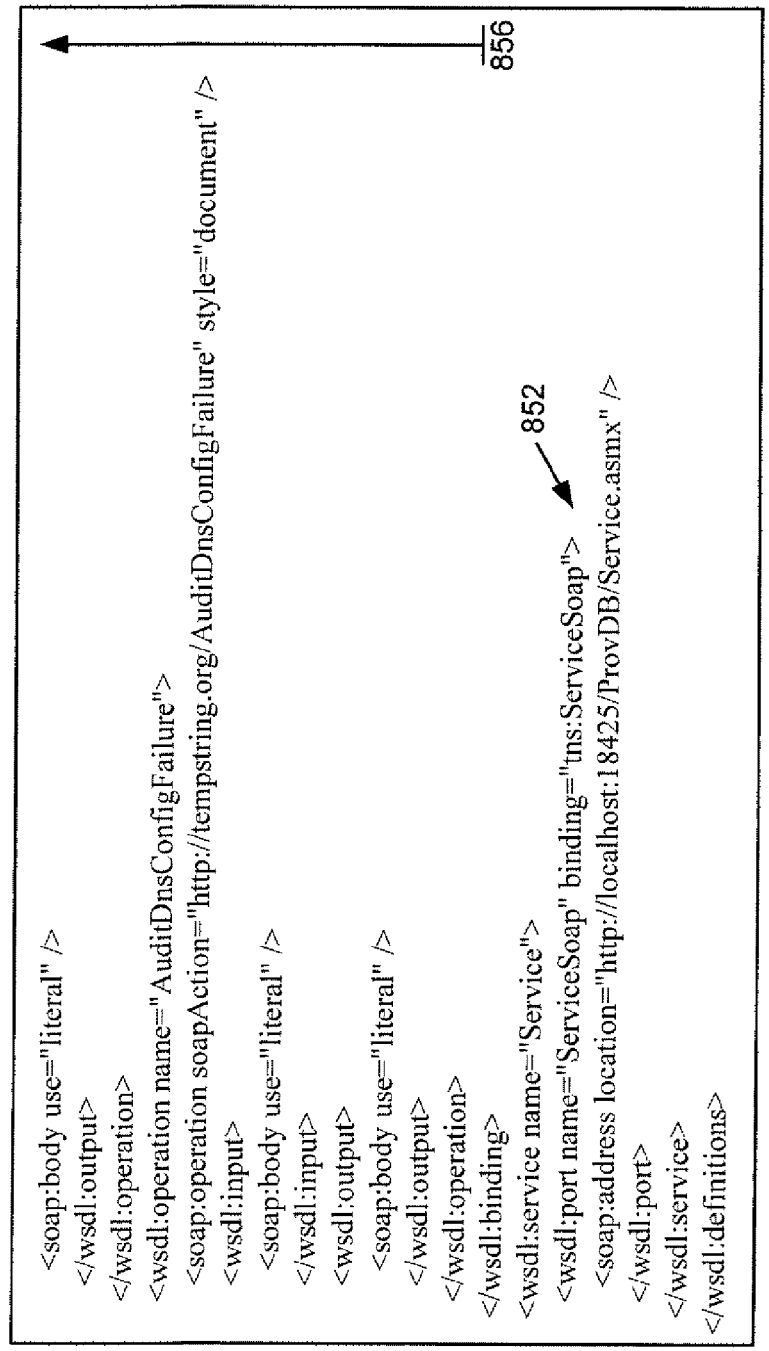

Interestingly, by defining communications between the client computer and the provider server, a WSDL document governs what a provider can ask and require of a referred client. A referral server provided WSDL document or software component 110 can limit communication formats between the client computer and the provider server. Thus, a software configuration component communicates with the provider server 112, for example, according to a series of client-server messages communicated according to a WSDL document, such as shown in FIG. 8.

Customer Interaction and Message Flow

Figure 2:
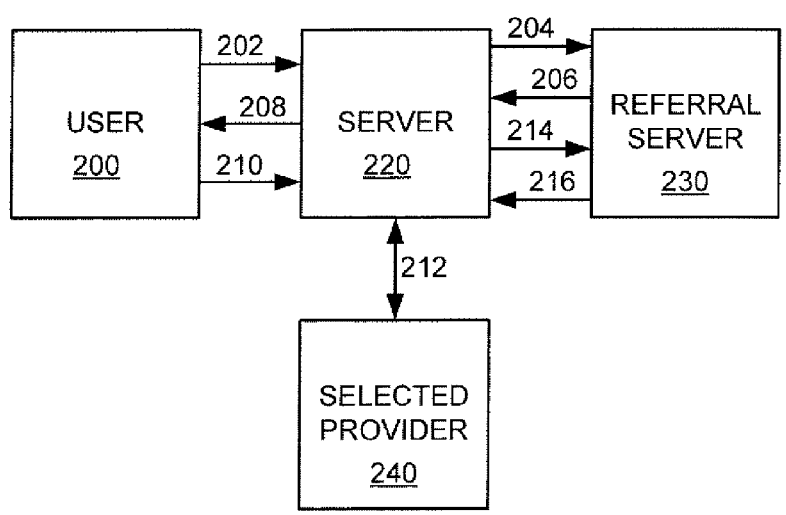
FIG. 2 is a diagram of an exemplary message flow resulting from user interaction with a client computer.

FIG. 2 is a diagram of an exemplary message flow resulting from user 200 interaction with a client computer 220. In one example, the client computer 220 is a server and the user 200 is interacting with the server 220 via a wizard (not shown). The server 220 sends and receives messages 204, 206, 214, 216 with the referral server 230 and sends and receives messages 212 with the provider server 240, using at least some of the information obtained from the user 202, 208, 210 via the wizard. Optionally, at least some additional information is automatically obtained by a software component(s) C1, C2 running at the server 220 (and not entered or selected by the user 200 via the wizard) and the at least some additional information is sent in a message 204, 214, 212 to the referral server 230 or to the provider server 240.

At 202, via a GUI, a user 200 selects or enters data a service such as domain name purchase, and the user enters additional data, such as a desired domain name or preferred language.

At 204, a server 220 sends a provider query to a referral server. In one example, the provider query 204 includes only the user 200 entered data 202. However, in another example, the server 220 sends both the user entered data 202 and additional data/information (not obtained via user 200 entered data), such as a country code, geographical region code, and/or a language-country code. In another example, the additional data/information 202 is a top level domain, a human language, an operating system version, a hardware port, a globally unique identifier of software, a globally unique identifier of hardware, a bandwidth quantifier, etc.

At 206, the referral server 230 replies with a message to the server 220 including a list of providers that provide a service (and or good). In one such example, providers on the list are order (a sorted list) by the referral server 230, indicating at least a provider to be displayed on top of the list. In one such example, the providers on the list are selected by the referral server 230 to be on the list from among plural providers based upon the additional data/information, historical provider performance, and or a consideration paid by a provider.

At 208, via a GUI, the server displays a list of one or more providers to the user 200. In one such example, the provider indicated by the referral server 230 to be displayed on top of the list is displayed first.

At 210, via an input device, the user 200 selects a provider displayed on a GUI. The user 200 selects a provider and purchases the domain services from the selected provider. Optionally, the user 200 selects and purchases other configurables. Optionally, the server 220 sends and receives one or messages 212 with a selected provider server 240 to purchase and configure domain name services (and or other configurables).

At 214, the server 220 reports audit information to the referral server 230. For example, the server reports 214 successful purchase information, initial configuration information, and/or on-going configuration information to the referral server 230.

At 216, the referral sever 230 acknowledges receipt of the audit information. In one example, the referral server 230 maintains records of server reports 214 received from many servers in order to compare successful purchase information, initial configuration information, and/or on-going configuration information among providers. In one such example, the maintained records of server reports provide historical provider performance.

Identification and Configuration Software

Software C1 running on a client computer 100, communicates 106 with a referral server 102 to identify specific configurables, such as VOIP, that can run in a geographical region of the client computer 100, at a bandwidth available to the client computer 100, and/or that is supported by the client computer 100 operating system. The software C1 also identifies one or more providers. Optionally, an identified provider list is limited to providers that will receive payment in a certain currency (dollars, yen, etc.) or to providers with customer service that will communicate in a certain human language. In such an example, the identification software C1 identifies configurables and or providers.

After an identified configurable(s) and provider is selected, configuration software C2 is provided 110 to the client computer 100, to configure the client computer 100 to operate with the selected configurable(s). The configurable software C2 configures the client computer 100 environment, to operate the selected VOIP software and or hardware. The configuration software C2 (1) sets an IP address to send and receive voice packets, (2) downloads and installs the VOIP application, (3) identifies and sets an IO port to receive a plug-in telephone type device, and (4) registers a telephone number with the VOIP provider 114. The configuration software C2 configures a selected configurable to operate at the client computer 100.

The configuration software C2 may require user interaction at the client computer 100, such as via a GUI. For example, a provider server 114 communicates 112 with the client computer 100 to provide telephone numbers for the user to select and to determine whether to listed the user in the white page directory. However, the configuration software C2 will also query the client computer 100 operating system directly without user interaction, such as to select a communication port, and to set interrupt priorities for non-VOIP components sharing bandwidth.

When a mailed hardware telephone arrives at the client computer 100 site, the client computer 100 is configured to receive the telephone plug-in at a communication port (e.g., USB port).

A client computer 100 located in Germany, running an English version of an OS, using Comcast as an ISP, receives 106 a list of two providers of VOIP, that support these constraints, such as Vonage and Yahoo. The user selects a provider and the client computer 100 communicates 112 with the selected provider server 114 to configure the VOIP (in this case, software and hardware) and to pay for the VOIP. The user plus the telephone into the communication port on the client computer 100 and begins making and receiving telephone calls.

Plural Configurables and/or Plural Providers of a Selected Configurable

There is nothing requiring referral server(s) to provide more than one good and/or service (configurables) to client computers. However, once technical and geographic information is obtained by referral server(s) about client computing environments, the referral server(s) may provide information to client computers specifically based upon the obtained information. There is also no requirement for a referral server 102 to identify more than one provider of a configurable. However, this information may also be valuable to a user of a client computer 100 in making choices about quality and price.

If a client computer 100 is an on-premise server, such as an enterprise or business server, that requires an Internet presence to provide network access to various software, such as a messaging platform for e-mail and calendaring, a database server, a branch management server, an access management server, a storage management, or a virtualization server, etc. These business or enterprise type services that provide an Internet presence are auto-configured to communicate on the Internet using a domain name and DNS service purchased or leased from a third party provider 108.

Software at the server C1 identifies services (configurables) supported in a geographical location, and upon selection of services, the server 100 is configured 112 to use the domain name and DNS server of a selected provider(2) 114. The steps to configure 112 the on-premise server to meet the needs of small business running in a given environment, are generalized to a WSDL document. Any third party provider 108 that communicates 112 according to the WSDL, can support auto-configuration, for example, of obtaining a domain name and setting up a DNS server. By using a component C2 communicating according to the WSDL document, the on-premise server can drive configuration via communications 112 with a selected provider 114 according to the WSDL.

For example, client computer 100 configuration changes are directed via a wizard or by gathering and setting other computing environment conditions. The cleitn computer 100 also sending and receiving configuration information to the provider server 114 without user inputs. The changes take place and are facilitated via communication with the provider server via the defined WSDL.

The software components C1 and C2 created according to the WSDL standard, capture, translate, or set; some or all of the information, often requiring little or no user input. Further, the referral server 102 referred a provider server 114 because the provider server 114 has been technically verified to provide the configurables. This technical verification can be a precondition to joining a referral server's 102 referral service. Thus, the provider server 114 referred by the referral server 102 is able to provide the configurables referred to the client computer 100. In at least one example, the software running at the client server (e.g., C1, FIG. 1) reports back to the referral server 102, whether or not the communications C2 with the provider server 112 resulted in a successful transaction and/or configuration (e.g., monitoring/feedback).

In this example, two software components C1, C2 are provided to the client computer 100, a client-referral component C1 and a client-provider component C2, where the client-referral component C1 monitors and reports results of the client-provider software C2. In one such example, communications of the client-provider component C2 are defined by the client-provider WSDL, and mandated as a provider bar of entry into a referral service program. If a provider server 114 technically supports the WSDL, then that provider server 114 can be technically verified (i.e., guaranteed or tested) to support the selected configurable.

Gathering Information about the Client Computing Environment

An auto-configuration software component C1, C2 provides information discovery and/or auto-configuration. The software component can be defined for auto-configuration of certain configurables. For example, when a client computer 100 user, selects a set-up or diagnostic wizard, instead of requiring the user to type "phone number," "country code," OS, etc., the component obtains and sends this information. Thus, the component is used for providing information about and/or configuration of the client computer 100 computing environment.

A provider server 112 (such as a VOIP provider) often installs another component/program (configurable(s)) such as a VOIP application, and the software component C1, C2 installs the VOIP application. As described above, the software component prepares the computing environment to support the VOIP application. Further, the software component downloads and configures the VOIP application, such as user name, phone number, voice compression/decompression software, or IP address for sending and receiving voice packets. Thus, the selected configurable, in this example, a VOIP application, is not the same as the software component C2 auto-configuring the selected component, although both may be downloaded to the client computer 100.

In one example, a client computer 100 is sold to a customer with an information gathering and referral component C1 already installed. This information gathering and referral software component C1 is already installed and available for communicating 106 with a referral server 102.

In another example, information can be gathered when the client computer 100 is communicating with the referral sever 102 via a network browser software. For example, a browser supporting an HTTP protocol typically responds and reports time zone, OS version, and IP address, and the bandwidth can be observed empirically. This information is used by the referral server to determine configurables that will operate in the native environment, and to determine configurable software C2 that will configure the configurables to operate at the client computer 100. Other information must be obtained from a user, such as a requested name for the new domain name, or the desired top-level-domain (TLD): ".com", ".edu", ".org", ".fr", ".gb", etc. The configuration software C2 can be provided directly or indirectly via the referral provider 102.

An on-Premise Business Server

In one example, a computer is an on-premise server 100 residing at a business owner's location and the on-premise server provides hosting for e-mail, remote access, and other collaborative features. The referral server 102 refers DNS providers who provide Internet presence, and a provider server 114 communicates 112 with an on-premise server 100 to auto-configure an Internet presence.

A referral server 102 identifies a service provider server 114 that provides and auto-configures selected services for an on-premise server 100 computing environment. In one such example, the referral server 102 provides a software component C2 that the on-premise server 100 utilizes to interact with the provider server 114 to configure services for the on-premise server 100.

If there is no pre-established relationship between a service provider server 114 and an on-premise server 100, the software component C2 communicates 112 with the on-premise server 114 to create an account to purchase services. The software component C2 provides an on-premise server 100 programmatic access to services of the provider server 114.

In one such example, a referral server 102 is used to identify, rank and audit domain service providers for referral to on-premise servers. A method searches through a data describing available providers and identifies at least one suitable providers based on geographical location, desired TLD, and/or other factors. Some providers will provide services in some countries but not others. Optionally, a method audits configuration and/or post configuration operational success for providers. An audit of success can be used to rank providers for future referral based on audited results of a purchase, configuration, and/or on-going performance.

A database schema is employed to maintain relationships between data fields used to implement the provider information, configurables, and/or any associated ranking information. A database schema may also be employed to maintain relationships between referred customers, selected configurables, and/or associated providers.

A message based network transmission is described for selection and auditing configurable providers, such as DNS services. A web service based protocol and its associated schema allows users to compare and select DNS services based on availability, price and other inputs; and at the same time provide automated configuration of and/or auditing of provider performance. With such an arrangement, a referral server can verify business and technical arrangements made with plural provides, and inform referred customers of dynamic conditions such new configurables available to existing customers, health status of a deployed configurable, or better price or performance that can be obtained for customer's on already deployed configurables. In one example, messages are used to identify and configure selected configurables. In one such example, the messages are formed according to a web service definition language (WSDL) message passing schema.

New Providers

Subject to technical and business standards of the referral service, any provider who meets and maintains the standards can join and remain as a provider in the referral service. Additionally, the list of configurables provided by existing or new providers is extensible. Optionally, more configurables and or providers can be added to the referral service, and existing configurables and or providers can be provided in new geological locations.

Configurables: Goods and Services

The described technology can be used to lease/sell configurable goods and services. For example, it can be used to sell printers, routers, scanners, servers, etc. For example, certain information can be provided by a user via a GUI, such as price range and features, and other information can be automatically determined and/or auto-configured (without user interaction) via a component C1, C2, running at the client computing environment, such as OS version, LAN or WAN protocol, available file server drivers, etc. Once a printer and provider is selected, auto-configure software installs software required to operate the printer in the computing environment, and the provider configures the printer according to the network conditions before shipping/delivering the printer to the buyer. Upon arrival, the printer is coupled into the computing environment and it works. Configuration software may identify the OS, the types of programs that will be printing on the printer, the level of graphics software that needs to be supported and other existing printers in the computing environment. The configuration information is obtained by the provider server via a software component, so the printer arrives configured.

In another example, a wireless router is auto-configured for installation. Configuration software queries the computing environment. This queried information is used to present routers that can be auto-configured in the computing environment and/or to present providers of routers to the user. Upon selecting a router and/or provider, auto-configuration software in the client computing environment communicates configuration details and settings with the provider's server, and configures the software environment for router installation. The provider uses the auto-received information to configure the router before shipping to the buyer. The buyer plugs the configured router into the configured computing environment. For example, the router arrives with the IP address and security settings set, and the required software is auto-installed in the computing environment during auto-configuration. This saves user time, since the configuration software configures the printer and/or computing environment based on automatically discovered information or conditions in the computing environment. This allows the user to purchase and utilize configurables that would otherwise be intimidating or impossible for non-technical consumers.

Reducing Provider's Expenses

A referral server directs customers to a provider and provides a dynamic environment for selling configurables and auto-configuring a buyers computing environment. Once a referral-provider framework is in place for a class of configurables, the costs to a provider to sell via the framework is reduced dramatically.

The referral-provider framework automates information gathering, configuration, and purchase of configurables. This reduces the cost per customer for providers.

Computing Environment Dependent Configurables

For a given computing environment, the available goods and/or services may vary. This variance in available configurables could be based upon computing environment conditions, Internet conditions, language limitations, currency availability, customer service human language support, OS support, region or country conditions, legal restrictions, etc. And, the conditions for restrictions are extensible without necessarily varying the technical aspects of a referral-provider framework. For example, a user in the computing environment may ask, what goods or services are available? When this question requires more technical information that may or may not be known or even available to the user (given their technical limitations), then an information barrier may preclude the sale of goods and or services. Often a technical expert must be consulted or employed to install or configure goods and services.

From a practical standpoint, a customer is unknowingly asking a technical, geographic, and language question, but that customer is unable to provide enough information to answer the question. Instead, the computing environment augments the question with information that is provided to a referral server. So an answer is specific and refined for that customer. The answer is tailored to that customer based upon specific information such as the computing environment, the geographical location (region, country, etc.), the OS, the human language, the bandwidth of the Internet connection, the language preference, the monetary denomination (dollars, peso, EU, etc.), and/or many other auto-determinable factors.

Multiple Providers of a Configurable

Figure 3:
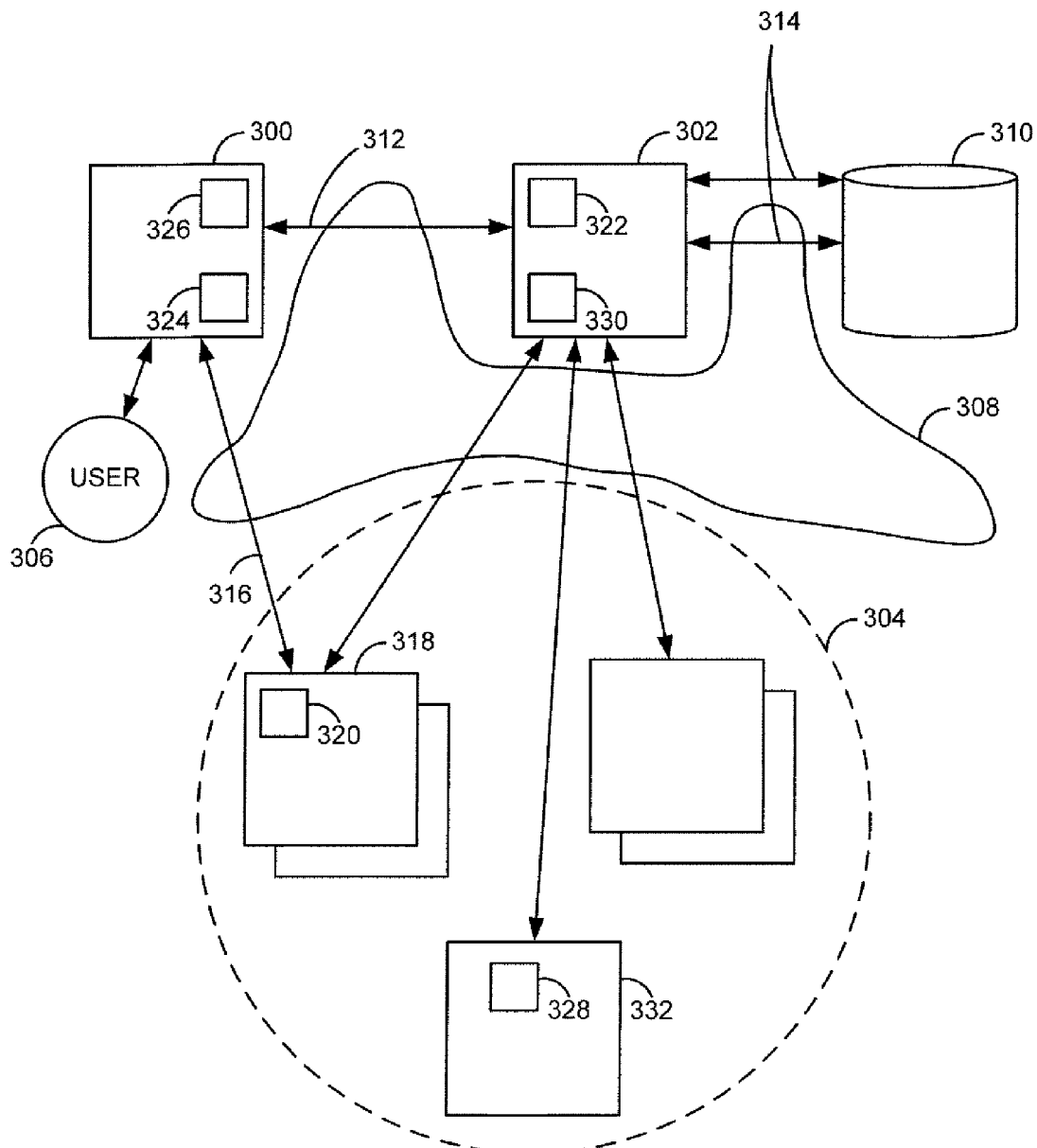
FIG. 3 shows a network system for an exemplary automated configuration of goods and services via a network.

FIG. 3 shows a network system for an exemplary auto configuration of goods and/or services via a network. In this example, there are three major components. One such component is a computer 300, such as a business server, a mid-market server, a home server, or a home computer, etc. The computer 300 may be an on-premise server that itself sells goods and/or services from any single or multiple computers in a computing environment. There is also a referral server 302, and "N" number of providers 304, that provide any particular one or more goods or services (i.e., configurables).

In one example, the computer 300 runs software (such as a wizard) that (1) collects and provides some information about the computing environment automatically without user inputs and (2) collects and provides other information via interaction with a user 306 via one or more input devices. The information (e.g., collected information) is not limited to descriptive information about the types of products/services desired but also includes information about technical aspects of the computer 300 and or ability or knowledge of the user, or communication capabilities of the user 306 or the computer 300 computing environment. The information can be collected by the wizard via interaction with the user 306, or can be data or computing environment conditions accessed by the computer 300 without human interaction 306. The information is sent 312 to the referral server 302 in one or more messages or packets sent via any communication protocol such as HTTP, SOAP, XML, or other communication protocol. The referral server 302 uses this information to determine what goods and/or services (configurables) are available, despite the restrictions the received information represents. The referral server 302 determines what configurables are available and which providers can configure and provide the configurables considering the restrictions.

Two or more provider(s) 304 have provided information about goods and/or services to the referral server 302. The providers 304 may access the referral server 302 via a network 308, such as the Internet. For example, a provider server 332 component 328 communicate with a referral server component 330 using messages, such as messages formed according to a web service or via an Extranet account. The information communicated from the provider server 332 to the referral server 302 about goods and services (such as domain names, VOIP, printers, routers, DNS services, TLDs, or tax services) are recorded 314 at a database 310 accessible 314 to the referral server 302 directly or via a network such as the Internet. The information may also include geographic locations, languages, and computing operating environments supported by a provider.

When the computer 300 sends the collected information 312 to the referral server(s) 302 indicating the computing environment restrictions (and/or the desired goods or services), the referral server(s) query 314 the provider information stored in the database(s) 310, receive a response 314 from the query and provide a response 312 back to the computer 300. The response 312 includes information about providers and/or configurables available according to the restrictions of the collected information. The response information is received 312 by the computer 300 and displayed to the user 306. In one example, after the computer 300 receives a selection from the user 300, the computer 300 begins communicating 316 directly with the selected provider 318, for example, via a web service. These communications 316 with the selected provider 318 may automate selection of a configurable and or the auto-configuration of a selected configurable.

The goods and services provided to the user/computer 300 can be purchased and/or configured initially, and then possibly purchased and/or configured in an on-going manner. A VOIP application, a VOD application, or a DNS service may require periodic payment or software updates.

In one example, the communications 312 between the computer 300 and the referral service 302 are accomplished via a web service. In another example, the communications 316 between the computer 300 and the provider server 318 are supported via a web service. Web services often have client side components 324 and server side components 320 communicating according to the WSDL. For example, the providers offer server web service end point components 320 that communicate with a client web service component 324. The referral server(s) 302 offer a web service end point component 322 that communicates 312 with a client web service component 326. Optionally, the referral server(s) 302 offer a web service end point component 330 that communicates with a provider web service component 328.

A computer 300 provides a wizard that a user 306 can navigate to request a domain name for an Internet presence. The Internet presence is utilized by the server 300 to provide as web sites, e-mail, remote access, etc. To enable these various services, a domain name is obtained. A wizard (not shown) interfaces with the client web service component 326, to collect the user input portion of the configuration experience of the server 300, to either obtain a new domain name or configure an existing domain name.

The wizard obtains from the user 306 and transmits that information via a client web service component 326 to a server web service end point component 322 at the referral server 302. Additionally, the wizard or another component 326 collects information from the system and/or computer 300 computing environment (as opposed to obtaining the information from the user 306), and transmits 312 that information via the client web service component 326 to the server web service end point component 322 at the referral server 302. Thus, in this example, at least some information is provided 312 from the computer 300 system and/or environment to the referral server 302, such as technical information, without requiring the user 306 to enter the information. This can be technically difficult information that a users 306 may not have know. In one such example, the user 306 is able to purchased a configurable and have the purchased configurable installed automatically, without the user being aware of a technical message/information exchange.

A list of providers that support desired services via auto-configuration is returned 312 from the referral server component 322 to the client web service component 326. Once a user 306 has selected (via a selection by link or other icon) a provider from the list (e.g., presented on-screen at the computer 300), the computer 300 initiates communications 316 with the selected provider 318 via a client web service component 324. For example, the client web service component 324 in conjunction with a wizard or otherwise, walks through (a series of graphical selections) selecting configurable(s), paying for and/or configuring the selected configurable, and that is communicated with the selected provider 318 via a server web service end point component 320 at the provider server 318.

In one example, the user wizard experience receives two user inputs (e.g., a domain name request (xys.com) and a provider selection (domainseller.com)), before the computer 300 obtains the domain name and configures the DNS service automatically for the computer 300.

The web service defines an interface for communication, and any client or server desiring to participate, needs to author a web service client component 326 or a web service server component 320, respectively. A server component 320 that complies with the web service interface can communicate with a client component 324. In one such example, a web service definition language (WSDL) is used to define the web service components. A WSDL defines the protocol or interface and XML is the payload of the protocol. In one example, a first WSDL is defined for the method of communication between the computer 300 and the referral server 322.

A database design defines how data is organized in a database 310, and function logic determines the way the data is used to select providers. In one example, the methods and systems provide an overall solution of providing goods and services to computers 300, such as obtaining, transferring, and/or configuring a domain name and related services, in an automatic fashion, and in an on-going fashion. In one example, the computer 300 obtains a second service-based component 324 from the Internet and drives the configuration of a service using the second service-based component by communicating 316 with a provider server 318 selected from plural providers referred to the computer 300 via a referral server 302. In one such example, a first service-based component 326 at the computer 300 communicates with the referral server, wherein the first service-based component 326 is designed to and obtains both computing environment information and user 306 entered information. The user 306 entered information is obtained from user input via a GUI displayed on-screen at the computer 300, whereas the technical information is obtained directly from the computer's 300 computing environment.

The referral server 302 allows a user 306 to obtain a domain name and DNS hosting services when the user knows they want an Internet presence but do not know that a domain name needs DNS support. Consider a business owner that desires an Internet presence for a purchased business server. Assume that the business owner's company name is Blue Flowers, Inc. The business owner selects an Internet presence wizard. The user enters 306 a domain name in a wizard field. A software component 326 gathers other information from the computer 300 computing environement. The component 326 communicates 312 and obtains information 312 about providers in the computer's 300 geographical location, and offers the information to the user 306. The user 306 selects a provider and/or configurable, and a component 324 auto-configures the Internet presence. The components 326, 324 provides the Internet presence and the user 306 is able to benefit from services they may not even understand. The components 326, 324, obtain information, purchase a domain name and DNS services, and configure a DNS service to point to the purchased domain name.

In one example, a computer 300 displays a wizard to a user 306 on-screen. The wizard and component 326 discover and display goods and services available to this computer 300. The wizard presents configurable goods and services (configurables) from one or more providers. The component 326 communicates 312 with a referral server to determine what configurables apply to this computer 300. A customer selects one or more configurables, such as a VOIP application and a printer. A component 324 communicates 316 with a VOIP provider 318 to configure, purchase and obtain VOIP. The communications 316 with the provider also configure this customer's computer 300 environment for supporting the VOIP application. The component 324 communicates with a printer provider server 332 to configure, purchase, and obtain the printer. The communications with the printer provider server 332 configure this computer 300 environment for supporting the printer. The printer provider server 332 installs (configures) a printer driver at the computer 300, so when the printer arrives the user 306 can begin printing. The VOIP provider server 318 installs (configures) a VOIP application at the computer 300, so when the user plugs a telephone type device into the computer 300 IO port, the user can begin calling on the telephone type device.

A user 306 may request information about what goods or services are available at their computers 300 geographical location. A software component 326 gathers information about the computer's 300 computing environment and sends the information to a referral server 302. The referral server 302 responds 312 with information about what services are available at the customer's location, such as a registrar provider (with domain names, top-level domains at this location), a DNS provider, a VOIP server, a tax server, VOD server, network storage, etc. The referral server 302 also responds with providers based on where the computer 300 is located, a desired human language, and/or a user's 306 technological capabilities.

In one example, a computer/user 300, 306 has certain attributes: (a) located in Wisconsin, (b) have a DSL connection, (c) OS and/or version 3.3, (d) able to pay in U.S. dollars, (e) desires human customer service communications in English, (f) and desires English text help pages, etc. Or, consider a computer/user 300, 306 with certain attributes: (a) located in France, (b) have a DSL connection, (c) OS and/or version 3.3, (d) able to pay in Euro, dollars, (e) desires human customer service communications in German, (f) and desires English text help pages, etc. In either case, attributes are sent to a referral server 302, and the referral server 302 replies with available services in the indicated area, such as domain names, VOIP, taxes, DNS services, VOD, etc. The list of services is returned 312 to the computer. The user 306 selects one or more of the services, the computer 300 forwards the selection to the referral server 302. The referral server 302 responds 312 with providers capable of auto-configuration of a selected service via a provider server 318 and according to the limitations (a)-(f).

Some services require initial and on-going configuration. If desirable, a web service is defined between a computer 300 and the provider server 318 for on-going configuration. In one example, a defined web service provides automatic on-going configuration via a defined web service interface. For example, is a selected service is network memory back-up, a client side component 324 identifies and catalogs desired back-up files on the computer 300. The client component 324 is downloaded to and auto-installed at the on-premise server. It periodically backs up catalogued files at network memory locations.

In one example, a WSDL is defined between a computer 300 and a referral server 302 provides information 312 about available configurables and providers, and a WSDL defined between the computer 300 and a provider server 318, provides configuration and/or payment for configurables. The configuration 324 can be initial and on-going, and the on-going and may result in automatic reconfiguration. For technically difficult goods and/or services (i.e., configurables), automating the collection of technical information and automating the configuration of goods and services based on this technical information, provides a way consumption can occur, even when the user is unaware of the meaning of the technical information, or the user is unable to configure the installation on their own. And, even if a user understands technical aspects, the automated process still saves user time and resources.

A client (on-premise server) may be communicating with the referral server with a browser via HTTP, but in some cases a richer user experience can be provided via a client side WSDL defined component, such as when the user experience is integrated into a native application during selection or set-up.

Optionally, a referral server 302 communicates 312 with a computer 300 if the computer 300 is operating a genuine authenticated OS. In one such example, the referral server 302 will communicate after an active authenticated is verified.

Solution for Acquiring, Configuring, and Monitoring Internet Domain Names

A computer 300 request 312 is referred to a third party vendor (provider) that can meet needs of a computer 300 and or a user 306 of the computer within a geography. A referral server provides a system of purchasing and configuring Internet domain services from an independent third party vendor for a computer 300. Optionally, the system configures, monitors and reports changing conditions for installed domain name services. These features are provided to server customers by plural providers of domain name and/or DNS services within given markets, as referred to server customers by a referral server.

Figure 4:
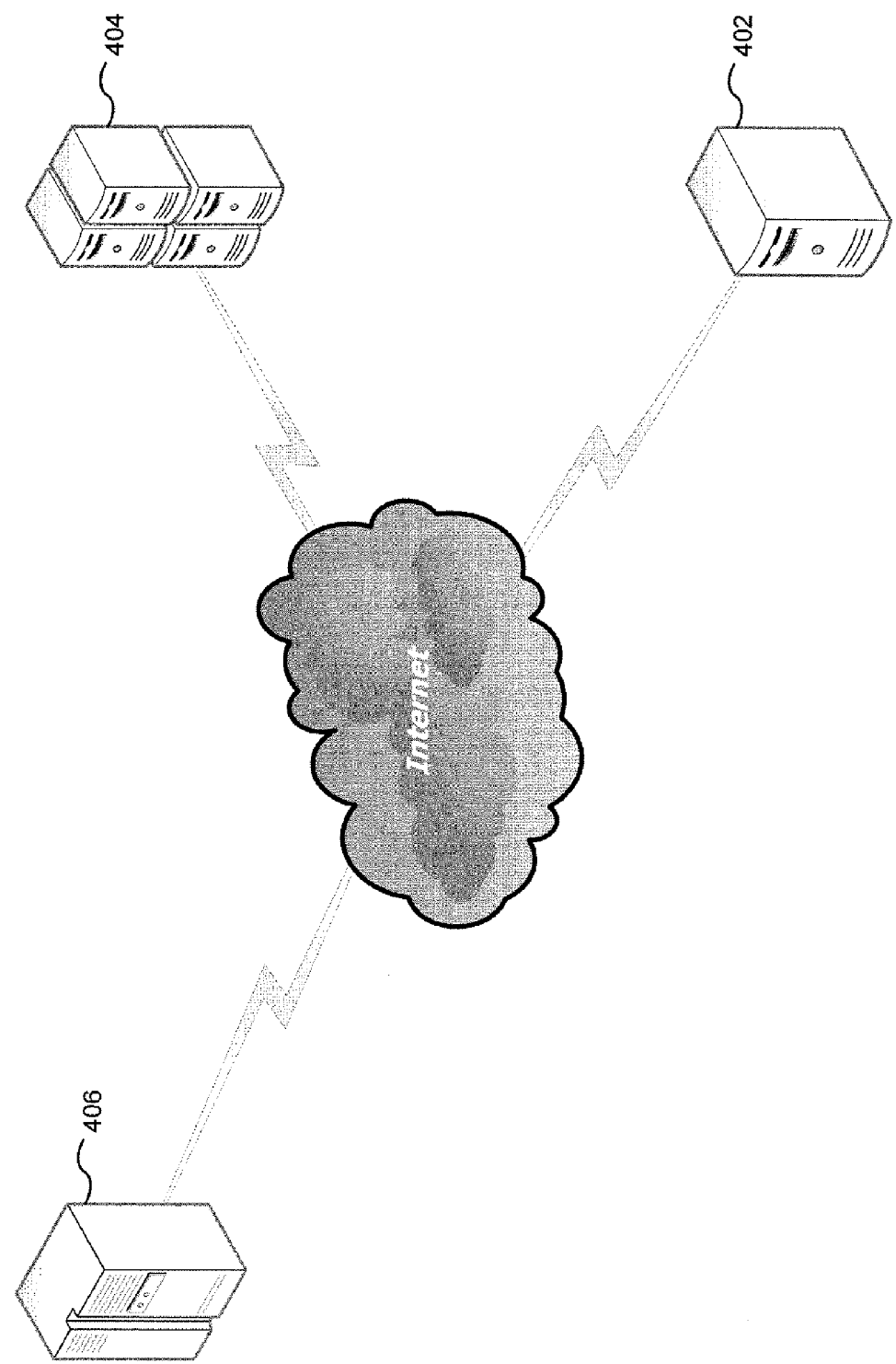
FIG. 4 shows a network system for providing an exemplary referral service to client computers.

FIG. 4 shows a network system for providing an exemplary referral service to client computers. A client computer 402 (e.g., a server) provides a simplified user experience integrated into a software component, a GUI-wizard, and/or a server setup tool (e.g., configuration software). The configuration software automates configuration of the Internet presence, VOIP, VOD, network storage, etc. In one such example, the configuration software communicates with a referral server 404 and a selected provider 408 via one or more web service definitions (WSDL(s)), although any communication protocol can be used. In one such example, all three components 402, 406, 404 are supported via a WSDL(s) framework, allowing for a majority of the user experience to be directly integrated into the deployment and management framework. In one such example, the server 402 interacts with the referral server and provider server(s) according to a proprietary protocol format. In this Internet presence example, provider servers(s) communicate to support domain name management and/or DNS hosting. The user experience is provider-customized for referral server 404 referred customer servers 402, and optionally, supports a referral server defined web service. A referral server 404 lists participating providers, describes services for listed providers, and offers referred servers 402 a directory of provider services 406.

Additionally, some aspects of the user experience at the server 402, such as account creation, and billing, are maintained between the provider 406 and the server customer 402 via a series of web templates. The general solution is integrated immediately into the out-of-box deployment experience of a purchased server 402, as much the value of a purchased server is unlocked by the successful configuration of various configurables, such as Internet presence (namely remote access and e-mail) or VOIP. Some customers will be unable to completely configure their domain presence information at deployment time, as they could be required to transfer a domain registration, which may require several days to complete manual paper documents to comply with transfer laws within any specific geography. In other geographies, physical verification of ones identity is required to obtain a domain name, such as the .fr domain in France. The design also allows for customers to forgo automated configuration at initial deployment time, and return to the task once they have successfully completed their internal network configuration.

Automated DNS Configuration

A client computer interacts with a service provider to obtain a domain name and Internet services. The client computer selects a service provider via interacting with a referral service. The client computer interacts with the selected service provider to install the selected services. A user of the client computer interacts (e.g., via a GUI) with the client computer to create a user account and to provide billing information with the selected service provider in order to purchase selected domain name and Internet services. The client computer is provided programmatic access to the services provided by the selected provider server, such that initial and optionally an on-going configuration can be performed.

For a user of a client computer purchasing a new domain name in a TLD that can be fully automated, the experience is often completed without manual intervention. The .com, and the .uk TLDs are the best examples of a fully automated installation of DNS services. Also relatively straightforward is a scenario for customers that already own a the domain name with a provider server that is offering services through the referral server. Those customers add the required services to their existing account.

For customers that want to buy a new domain with a registry that requires manual steps to completion, the process is paused during the manual configuration period, as described below. For the .au TLD, paperwork is completed and mailed for those customers that transfer domains. After the manual portion is completed, a customer completes the non-manual portion as described below.

Figure 5:
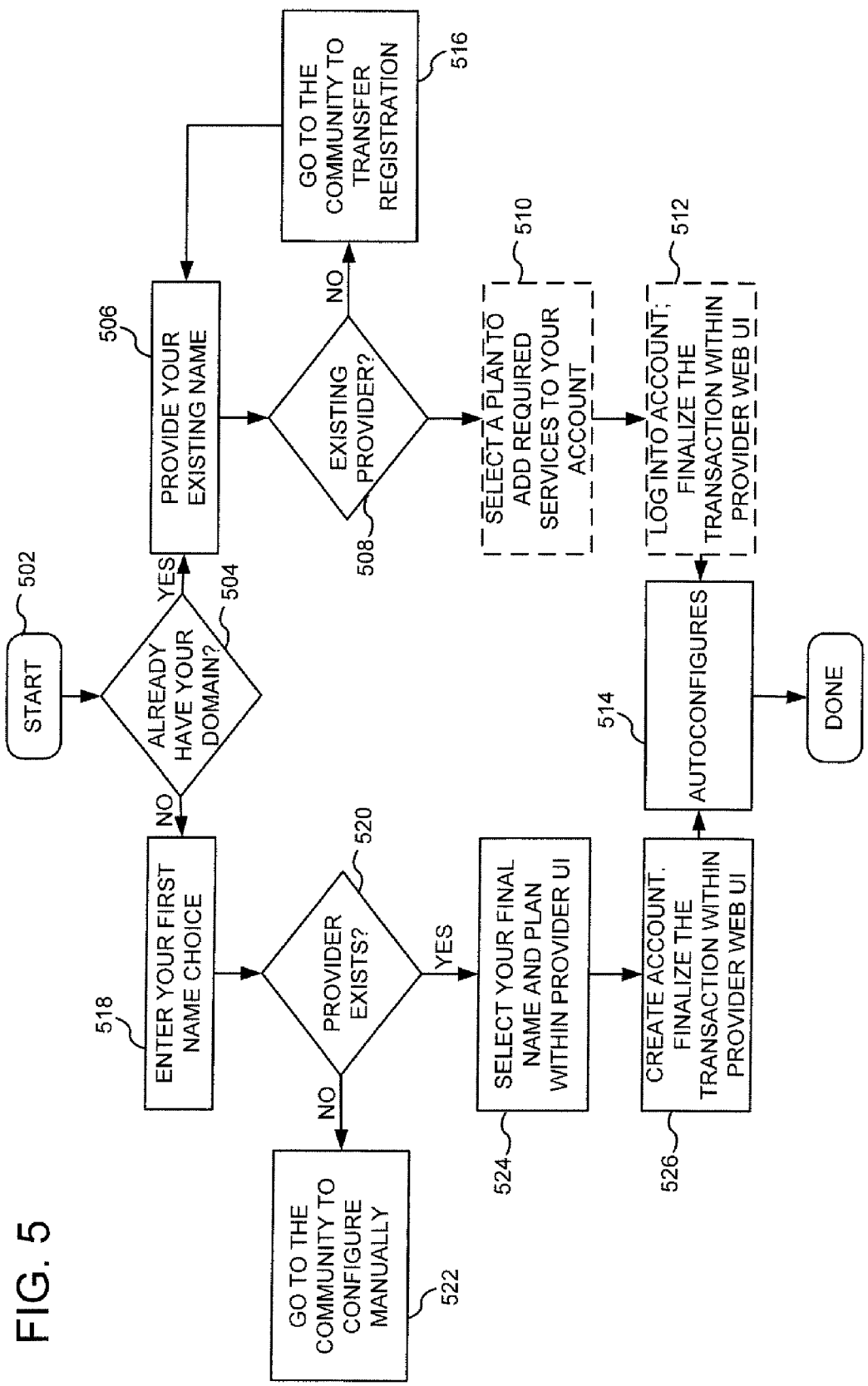
FIG. 5 is a flow chart representing an exemplary user interface experience for a client computer.

FIG. 5 is a flow chart representing an exemplary user interface experience for a client computer.

At 502, a GUI requests whether a user is interested in obtaining an Internet presence. If a user indicates via an input device that they are interested in obtaining an Internet presence, the flow chart commences.

At 504, the GUI presents an indication of choice, and the client computer receives via the GUI, a user input indicating whether or not they already have a domain name.

At 506, the GUI presents an indication of choice, and the client computer receives via the GUI, a user input indicating an existing domain name.

At 508, the client computer determines whether the provider of the existing domain name is an existing provider that supports the automated configuration of the client computer desired services such as remote access, e-mail, etc.

At 510, since it is an existing provider supporting automated configuration (e.g., according to a referral server defined WSDL(s)), the GUI presents a plan(s) to add to the existing account.

At 512, a provider UI presents a login account page, and other pages finalizing the transaction, and the client computer receives via the provider UI and communicates to the provider, a user input indicating a selected plan for the domain name.

At 514, the client computer auto-configures the selected services via communications with the provider server and the service goes live. In one such example, the client computer and the provider server communicate and auto-configure according to a referral server defined WSDL.

At 516, if the client computer has an existing domain name but the existing provider is not a provider currently being referred by the referral server (e.g., offering auto-configuration, auditing etc.), then the customer is directed textually via the GUI to transfer to a referral server referred provider. Once the domain name has been transferred to a provider referred by the referral server, then the server customer can return to continue auto configuration at step 506 above.

At 518, if the client computer has no existing domain name, then the GUI presents an indication of choice, and the client computer receives via the GUI, a user input indicating one or more desired domain names.

At 520, the client computer determines whether a provider exists (e.g., for the existing domain name, TLD, geography, etc.) If no existing providers exist for an inquiring client computer, then the GUI informs the user to configure their Internet presence manually 522.

At 524, since one or more providers exist in the referral program, the GUI presents an indication of choice, and the client computer receives via the GUI, a user input indicating a final desired domain name and Internet presence plan.

At 526, a provider UI presents a create account page, and other pages finalizing the transaction via a provider web UI, and the client computer receives via the provider UI and communicates to the provider server, a user input indicating a final desired domain name(s) and Internet presence plan, and then continues at step 514.

As stated at steps 512 and 526, a provider UI is described for receiving and communicating certain information. In one such example, the change from server GUI to provider UI occurs in implementations of the client computer that support two separate WSDL defined software components (e.g., C1, C2), one that defines communications between the client computer and the referral server, and one that defines communications between the client computer and the referral server.

Ranking Using Initial and on-Going Auditing

In one example, a series of GUI pages (wizard) are traversed and interacted with by a user at a client computer. The interactions with the wizard drive a web service client running on the client computer to communicate with one or more remote servers to cause the identification, purchase, and configuration of configurable goods and/or services (configurables).

A message(s) is sent to a referral server indicating that a domain name is desired. The message(s) include at least some information entered by the user via the wizard, such as a desired domain name and a top-level domain (TLD) designation (e.g., .com, .edu, .ft, etc). The messages also include information collected by the web service client directly (without user input) from the client computer, such as the operation system version.

The referral server returns a message(s) to the client computer including at least one provider (if the client computer is in a supported location) who can provide the desired service, such as the domain name and DNS services. For example, if the user wants to purchase a domain name "flowers.com", the user enters their address, their preferred human language, and their region and/or geographical information. As stated before, the user may enter that they are in Germany running an English version of the software, the referral provider will return the list of providers who can provide the service in that language and geographical location.

When the user selects a provider from the list, then a message(s) is sent from the client computer to the selected provider. The client computer and the provider server communicate message(s) to purchase and configure the domain name and DNS service. Subsequently, and optionally, the referral server and the client computer communicates message(s) reporting/auditing the success of the purchase and/or configuration. If auditing is performed, it can be used to rank provider service, which is useful in reporting comparative provider performance to existing and future customers, but also to determine whether any minimum performance or business standards established (e.g., by contract) between a provider and the referral service are being met. Optionally, the client computer and the referral server will communicate messages to provide on-going auditing of services and/or to report new configurables, upgraded existing configurables, and/or new configurable providers. Thus, auditing provides empirical evidence that can be used for price and performance determinations. Additionally, rankings can be used as one of the factors in moving a provider up or down the list of providers displayed to customers. This success/performance is one way of moving up the list of providers. In one such example, the audit information is communicated to the referral server from the client computer via message(s).

For example, if a user was hosting e-mail somewhere else and then decides to use this computer 300 to host e-mail, the audit information will report how smoothly the automated transaction went, and/or how quickly a provider server sets the mail exchanger (MX) in the DNS server. In one example, a user enters a ranking (e.g., 1, 2, 3, 4, 5, etc.) to indicate/rate how well a provider server performed. A DNS server provides an IP address where an e-mail or other data should be directed. Thus, auditing provider information about purchase experience and/or setting up the DNS server is useful in comparing DNS service providers. A DNS service can also be audited subjectively by determining whether/when a DNS record is updated.

Auditing information can reported by a computer to the referral server initially and/or over time. In one example, the referral server 302 receives and records computer 300 selections for initial selection and purchase of configurables and or providers. In one such example, the metric is the time required to navigate the purchase, the time required to automate initial configuration and/or whether or not the initial configuration is successful. In the mail exchange example, the referral server could access the DNS server to determine when the new IP address went live. A mean or average time to successful configuration can be used for sets of provider-client experiences. A configuration may utilize a dynamic DNS service. As the customer's gets a different IP address from the ISP, the dynamic DNS server needs to be update in a timely manner. In one example, this dynamic update period is audited for comparison purposes.

In one example, a database schema carries plural providers, plural languages (e.g., English, French, Japanese), and plural locales (France, Germany, California, Manhattan, Zip Code, etc.). In such an example, a request indicates a region/locale, a selected domain (.edu), and a language (German). An exemplary response includes a list of providers that can support the indicated language, location, and selected domain; plus the name of providers and possibly a link for more details. Provider prices may be returned with this list, or in a subsequent phase communication.

Of course, a referral-provider framework is extensible since the functionality is in place. For example, additional information can be returned in the list of providers such as provider prices, bandwidths, credit card support, security certificates, etc. In one such example, the referral server establishes a minimum set of information that a provider must disclose or supply on a returned list, or otherwise. A referral server is obtaining information from providers and forwarding some of that information in lists to client computers. The referral server can require an enumerated minimum set of information from providers as a barrier of entry into the referral program.

Software Layers

Figure 6:
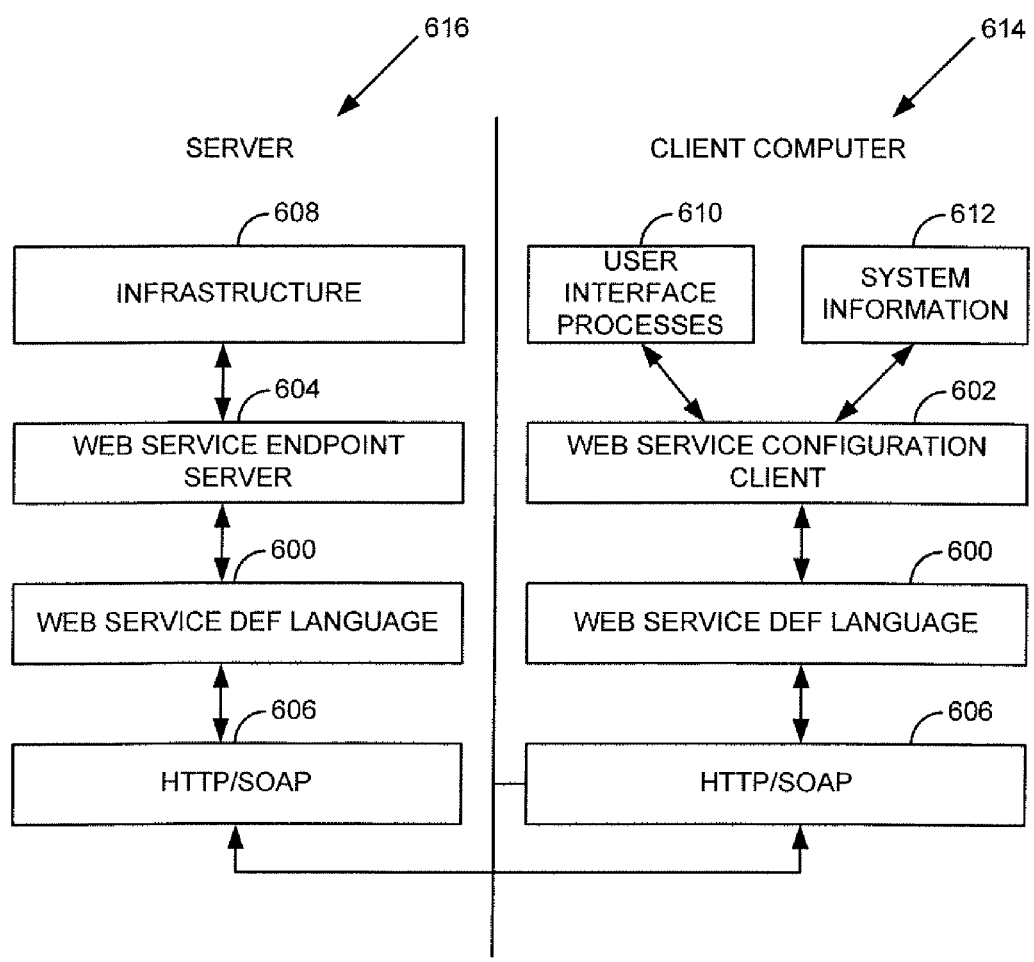
FIG. 6 is a block diagram representing exemplary software layers including a web service configuration client.

FIG. 6 is a block diagram representing exemplary software layers including a web service configuration client. The web service definition language 600 is an industry or configurable specific schema that the client side configuration software uses to communicate with the server side web service endpoint server 604. The client computer 614 communicates with a server 616, either a referral server and/or a provider server, or both.

In this example, the client computer 624 and the server 616 communicate according to an HTTP/SOAP protocol 606. For example, a provider server 614 supports a WSDL by supplying a web service endpoint server 604, and a referral service may control the user experience, by defining a WSDL that providers should support to obtain entry into the referral program. The referral service may be agnostic with respect to the infrastructure 608 of a provider server, so long as web service endpoint server 604 supports the configuration activities for web service configuration clients 602 communicating according to the WSDL 600.

In the case of referral server as the server 616, the referral server and client computer 614 communicate according to a client-referral service defined WSDL 600. Of course, one WSDL may define communications for client-provider communications and client-referral communications.

On the client computer 614, a GUI 610 receives user inputs or selections and communicates this information to the endpoint server 604 via the configuration client 602. The configuration client 602 operates (often without requiring user input 610) to obtain or set system information 612 such as by reading/writing to/from computer memory, querying/updating OS services, or querying/setting hardware devices of the client computer 614. However, the configuration client 602 also interacts with a user via a GUI 610.

As an example, if a user of a client computer 614 desires a domain name, a user of the client computer clicks a GUI 610 icon requesting a domain name and or Internet business presence. The GUI 610 icon can be presented to a user at the client computer 614 during initial set up, or thereafter. One or more providers are obtained by the configuration client 602 via the endpoint server 604 at the referral server 616. A provider(s) is displayed to a user of the client computer 614 via a GUI 610. A user selects the provider via the GUI 610. The configuration client 602 communicates the provider selection to the endpoint server 604 of the referral server 616. In this example, the configuration client 602 is a single software component communicating with both the referral server and the selected provider server. Thus, the server 616 side of FIG. 6 also represents exemplary software layers at the provider server 616. The configuration client 602 communicates with the endpoint server 604 at the provider server 616 to purchase a domain name and DNS services. The configuration client 602 communicates with the endpoint server at the provider server 616 to configured the DNS services, so the DNS server points inquiries about the purchased domain name to the a proper endpoint at the client computer 614 computing environment, such as a mail server, a database server, etc.

Optionally, a configuration is monitored over time, to verify a successful start-up and to verify continued successful operation. A WSDL schema 600 can include methods/messages that request certain information about and/or measure certain performance behaviors regarding purchase and auto-configuration with the provider server 616. For example, the configuration client 602 can report to the endpoint server 604 of the referral server 616, a client computer 614 configuration experience with a provider server.

This allows the referral service to report performance or price considerations about providers to requesting client computers, such as during referral. Reports to and from the referral service may include such information as installed configurable performance, pricing, purchase experience, initial configuration, or on-going configuration. For example, a WSDL may include a method/message that returns the number of times a DNS record was changed last month. The referral server could request this information from a WSDL defined method/message, and report the results back to the user offering an updated or more economical service to a user. Or, a configuration client may periodically report to the referral service without requiring referral service inquiry. An example message displayed at a GUI 610 may state, "Your DNS records were changing about once a month and now it is every day. Should we change to a provider at a lower cost since you are paying once per DNS change? Click here if you would like information about a lower cost provider?"

In such an example, the configuration client 602 is used to retrieve/report information about configurable/provider performance, and or provide comparison and or pricing information to client computers. The configuration client 602 is used to monitor performance and set-up with new providers when changes are requested by a user responsive to a monitoring report displayed 610 at the client computer 614. The monitoring report 610 can be displayed on a GUI responsive to a method/message defined in the WSDL.

The client computer 614 configuration client 602 obtains and reports computing environment information to the endpoint server 604 of the referral server 616. The referral server 616 provides a list of services available in the client computer 614 computing environment. The client computer 614 user (via a GUI 610) selects a service from the list. The referral server 616 provides a list of providers who can provide the selected service according to the conditions of the client computer 614 computing environment, such as obtained from a configuration client 602 query of the OS 612.

Upon user selection of a provider/configurable, such as via a GUI 610, the client computer 614 communicates with an endpoint server 604 of the selected provider's server 616 to pay for and auto-configure the client computer's 614 computing environment to operate selected services.

Optionally, the configuration client 602 monitors the auto-configured goods and services and reports performance conditions and or pricing conditions to the referral server 616. The referral server 616 reports this monitored information to new or existing client computers. Additionally, the referral server 616 can report new features, new configurables, or new providers to new or existing client computers of the referral server.

Disclosing Information Sharing

In one example, when a configuration client 602 obtains information from system services 612 to report to an endpoint server 604 at the referral server 604, the configuration client 602 requests permission from the user via a GUI 610. The GUI report a message such as "Click 'Yes' if disclosing the following information is approved." If desirable, the actual information being disclosed can be listed in the GUI.

For example, information is sent to the referral service by the client computer, such as OS version number, computing environment conditions, bandwidth, etc. This information is used to determine configurables specific to a client computer 614. If desirable, sent information is disclosed and approved in a general sense via a GUI 610, or information can be disclosed and approved in an itemized or specific sense.

Intelligent Referral of Providers

A referral service automates acquisition of information without requiring the user to know or understand the nature of the information needed for selection and automated configuration of goods and/or services (configurables). This provides significant commercial advantage. For example, the referral service enables "smart offerings" of configurables and it enables "auditing" of initial and on-going performance. The referral service provides an automated acquisition and auto-configuration experience.

In one such example, a referral server generates a list of providers based upon inputs, such as geographical location, OS type or version, available TLDs for the geography, TLDs desired, technical limitations of a computing environment, available bandwidth, other hardware sharing a LAN or WAN, software versions, shared resources, etc. Not all providers can provide a desired TLD, and not all providers support a configurable for every OS version, so a returned list of providers that supports both saves time. A user does not need to sift through the returned list to eliminate providers or configurables that can not be configured in the user's computing environment. Thus, the software components C1, C2, 602 obtain a list of configurables and or providers that can operate with/in the client computer 614 computing environment. Thus, the referral service provides computing-environment aware configurables and providers.

A configuration client 602 provides computing environment information to an endpoint server 604 at the referral server 616, such as version of an OS requesting services, available memory, available communication ports, etc. The configuration client 602 provides information to a referral server 616 necessary to determine which configurables are support by which providers, based upon environment restrictions and/or desired features obtained from the system information 612. Providers returned by the referral server 616 will satisfy a specific client computer 614 both for obtained system information (e.g., technical restrictions) and for requested 610 user features.

For example, a customer in France (locale), buying a ".de" (TLD), running an English language OS on the client computer 300, and paying in US dollars ($), will receive providers who can satisfy these requirements. An intelligent referral service search returns three providers in France, that sell ".de" domain names, and that have web pages to purchase in English language (provider x, provider y, and provider z). In one such example, although not required, at least one input (e.g., locale and/or language) is provided from a client computer 614 computing environment such system information 612 via a configuration client 602 to the referral server 616, as opposed to a GUI 610 input from the user. The configuration client 602 may display (via GUI 610), a permission request to send information obtained from the system information 612 to a referral service or provider service. The permission request and click acceptance displayed at the GUI 616 is not considered user input of information, it is permission to send system information 612 obtained from other than user input 610.

The referral service uses information to reduce the number of providers to providers who can actually provide the service. The qualified providers are sent to client computers, and client computers selected from qualified providers. Thus, a responsive schema 600 is responsive to and supplies those providers that can provide a given TLD, for a given OS, in a specific locale. With a responsive schema, listed providers can provide the restrictive set of services.

In one such example, a user does not know or does not understand some of the information needed to determine which providers can service a user's computing environment. Since the user does not know the information, the user can not enter the information that the referral server 616 needs to make an intelligent provider or configurable referral. Thus, an intelligent referral is automated or by obtaining the unknown information from the system information 612.

A configuration client obtains some information from a user via GUI 610 and other system information 612. The configuration client side gathers required information, such as locale or language. The information may have been collected 610 before from a user who did know or from system information 612. The information may also be implied from other system information 612, such as OS version, or a globally unique identifier of hardware or software installed in the client environment.

ASP Scenario

In another example, a referral service receives requests from clients via an application service provider (ASP) scenario. In one such example, the referral service receives an indication of a class of configurables that a client desires. The referral service provides a class based software component, indicated for the class of configurables that the client desires. The client downloads and runs the class based software component. The class based software component obtains specific information about the computing environment and returns that information to the referral service. Responsive to the specific information, the referral service provides a list of providers who can communicate with the class based software component running at the client to auto-configure the class of configurables desired by the client. The client selects a provider from the list via a link provided in the list. The class based software component communicates with the provider's server and auto-installs a configurable at the client. Since the class based software component is now native at the client computer, the class based software component can provide monitoring reports to the referral service.

Genuine Software and Hardware

In one example, whether in an ASP scenario or otherwise, a software component is downloaded to a client computer for obtaining information about the client computing environment or for auto-installing a configurable. In one such example, the software component verifies the authenticity of one or more software and/or hardware components in the computing environment. If the one or more other software or hardware components are not authentic, the software component reports that information back to the referral server, or to another server.

Optionally, the referral sever will not continue if the client computing environment is not authentic. Optionally, the referral server may require a client computer to update any expired or non-existing licenses before continuing. Thus, the referral server may require genuine software or hardware before allowing intelligent configuration.

Defining Sets of Information

In another example, a referral server defines a set of information required to refer configurable provider(s) in an intelligent way. A set of information can be defined via a WSDL. A WSDL is defined for a configurable class (e.g., printers) and/or a configurable industry (e.g., domain name providers). Providers that implement components that communicate with a referral server according to a defined WSDL, can communicate with a referral server, the information necessary for a referral server to provide configurables to clients intelligently.

In another example, a referral server defines a set of information required to determine what configurables a client computing environment supports. Clients that implement components that communicate with the referral server according to a defined WSDL, can communicate with the referral server, the information necessary for the referral server to offer configurables and/or providers intelligently to the client. A client component that provides technical information and configures a technical computing environment and setting(s) according to a defined WSDL, provides the services necessary to auto-configure goods and services in the client component's computing environment.

In another example, a referral server defines a set of information required for clients communicating with providers to purchase and install a configurable(s). Clients and providers that implement components that communicate with each other according to a referral server defined set of information, provide the information and action required to purchase and install a configurable referred by the referral server.

Thus, sets of information defined by a referral server via one or more WSDLs provide standards for building components for automated search, automated purchase, and automated installation of configurables. In another example, a referral server refers a provider that installs a configurable for a period of time.

Geography and Extensibility

In this example, a message passing includes a set of information (at least three inputs) such as geography, TLD, and Language. One or messages including at least the set of information is sent by a client computer to a referral server.

In one example, the three inputs are obtained from a user via a GUI running on a computer. In another example, at least one of the three inputs is obtained by a configuration client 602 from system information 612. In another example, at least one of the three inputs is obtained by a configuration client 602 via a GUI 610. In another example, all three inputs are obtained by a configuration component 602 from system information 612. The set of information is obtained by the configuration component, and inputs are packaged in a message(s) and sent from a client computer to a referral server, for example, via the Internet.

In one example, a message comprises three inputs: geography, TLD, and Language.

Geography indicates the location of the computer. For various reasons, such as technological, business, political, legal, market share, agreement, or otherwise, not all providers and/or configurables are referred world-wide. Or, referral and/or configuration may vary based on geography. Geography can be provided via any indication of location, such as longitude and latitude, router proximity, country, state, region, county, postal designation (e.g., zip code), telephone (e.g., area/region/country code). In Canada, certain sections communicate in English, while others communicate in French. Geography indicates locations where a provider and/or configurables can operate based on whatever constraints, and is dynamic and extensible as constraints change.

A TLD (e.g., .com, .org, .edu, .fr, etc.) applies in the context of some Internet based configurables and is useful for this and other examples involving domain names.

Language is the language(s) of the OS of a computer requesting configurables. For example, the human language characters and words that the OS communicates with a user, such as English, French, Polish, and/or Mandarin, etc.

In this example, a message(s) passed to the referral server includes geography, TLD, and language. This information is used to select and refer a provider(s) who can sell/lease a domain name and/or DNS service to a client computing environment messaging the set of information.

A defined set of information such as inputs is extensible, so various inputs such as currency (e.g., dollar, yen, peso, etc.), credit card types (e.g., VISA, etc.), maximum price, and/or customer service verbal language, and many others, can be added over time.

Information, such as inputs, providers, and configurables is available to a referral server, for example, in a database. The database may also contain information obtained about client computers, and/or referrals to providers. The database may also contain metrics about audited provider performance or profits, and/or customer satisfaction, etc. The database design is extensible as providers, configurables, client computers, and/or customers change.

Domain Name Request Wizard

A domain name request wizard may request certain information and preferences from a user in order to create an intelligent provider list.

A first page of a wizard 610 requests a TLD designation. The user fills in the requested domain name "BlueFlowers" and the desired TLD ".com". In this example, the system information 612 indicates that the server software is licensed to Blue Flowers, Inc. 123 Blue Ridge Street, Happy Lane, Calif., 95354, USA. The configuration client 602 automatically obtains the geography information (City, State, Country, ZIP, etc.) from license information contained in a system file. Additionally, the configuration client 602 determines from system information 612 that the operating system help files are in English, so the configuration component automatically provides "English" as the language. In one such example, since the user added state information such as their address at set-up time, the configuration client would automatically populate a wizard input field with company name as one of the initial proposed domain names and propose the .com TLD since that is the most popular name in the customer's location.

A second page of the wizard 610 provides check boxes and/or other input forms. The user then checks/indicates available features they would like the configurable and/or provider to support. For example, privileged registration (hides identity of domain name registrant), secure certificate, maximum price willing to pay for configurable, credit card support, currency, bandwidth, wireless support, provider proximity, customer service language, consultant referral, length of registration, portable domain names, government domain names, and/or etc.

As a wizard 610 user checks/indicates various features, additional information may also be collected from the configuration client 602 via the system information. For example, if a user requests a provider capable of providing certain bandwidth, this may require the configuration client 602 to confirm via system information 612 that certain hardware and/or software resources are available at the client computer 614. In many cases, the user may not even understand the question if it had been asked by the wizard. In such cases, it is beneficial for the configuration client 602 to obtain the information automatically from the system information 612. Information is messaged to the referral server and used to intelligently select configurables and/or providers.

Database Design

Various methods can be used to design a database that holds relationships between providers, configurables, and/or referred client computers. A database 310 is accessible to a referral server 302. For example, database information can be to identify a list of providers returned to a client computer. Database recorded monitoring information can be is used to select a provider to refer and or to order the list of providers.

Figure 7:
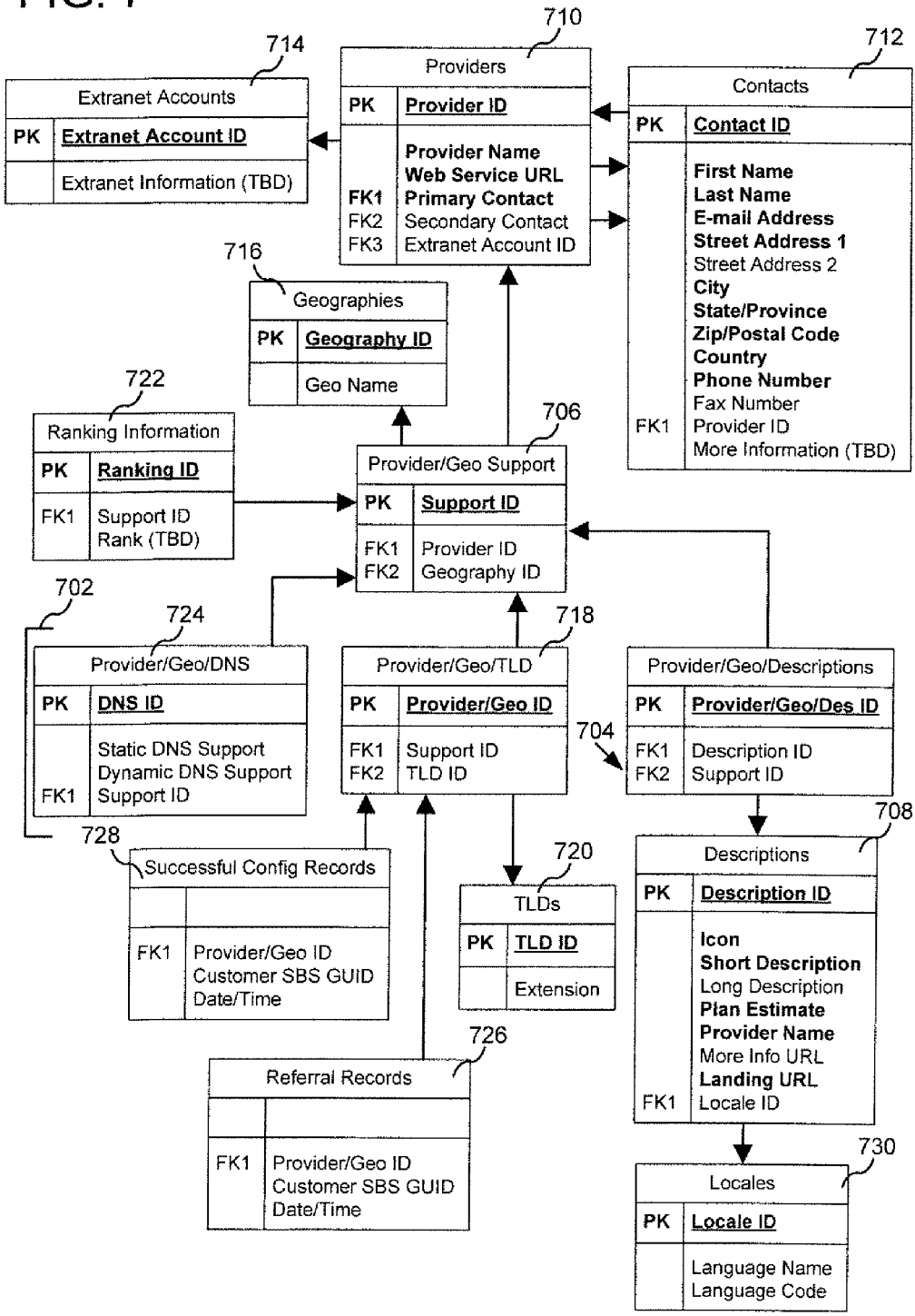
FIG. 7 is a database design that relates information for providers referring configurables such as domain name services.

FIG. 7 is a database design that relates information for providers referring configurables such as domain name services. In this example, a cell 702 groups combinations of data that can be implemented, for example, as a table. In this design example, a primary key (PK) is a unique identifier of data combinations in a data table. A foreign key (FK) is a reference to a unique PK in an outside table. For example, a support ID 704 is a FK for a unique PK in an outside table 706. Descriptions 708 are associated with providers.

A computer 300 provides a set of requirements that are sent to a referral server 302. The referral server 302 sends back information about providers that will support the desired configurables. For example, a list of providers is sent back, and for each provider the list may include on or more of the following provider descriptions 708: icons, descriptions, plan estimate, provider name, more information URL, landing URL, local ID. The provider descriptions are helpful to a customer operating a client computer 300 to gain information about and select a provider. A landing URL is the URL the customer links to when a provider is selected. A support ID 706 is the mapping from provider to geographic location, so provider X, can sell in these geography IDs. Providers in the system 710 have a name, a web service URL, a primary contact, a secondary contact, and an Extranet account ID. A primary contact 712 is the name, address, e-mail address, telephone number for the primary contact for a provider. Providers 710 may also have a secondary contact. The Extranet account 714 is an identifier a provider uses to log-on and change information, such as descriptive information 708 about the provider. Geography is a name or identifier given to a geographic location(s) that a provider supports/operates. Providers are mapped to the geographies they operate in or support 718. So, providers 710 can do business in various geographies 716. One provider can sell in countries A and B, and can sell certain TLDs 720 in country A (e.g., .com, or .edu) and can sell other TLDs in country B (e.g., .com, .gov, .fr, etc.). Providers have an order that of display on a returned list. How providers on the returned list are ordered can be based on a rank 722. The rank assigned may be based upon a number of factors, such as performance of initial and ongoing configuration, customer service quality, price, highest advertising/referral payment, etc. The rank may also be overridden for various purposes, such a fee paid to be on top of the list. A DNS identifier 724 is a mapping from a customer's purchased/leased Internet domain name to an IP address. Some providers allow resetting infrequently, some more frequently, such as for dynamic DNS support. A referral server may require providers to provide dynamic DNS in some countries, such as the United States; but may allow static DNS in other countries, or regions. An indication that a customer linked to a selected provider on the provided list is recorded 726, as well as an indication that the configuration was successful for a purchased/leased configurable 728. The record 726 includes an expiration date for a set-up/configuration for a customer, so renewal or on-going configurations are supported for the same and/or other providers of configurables. A record may be provided if a customer purchases other services. A record may be provided to record how often a customer has trouble with the configuration or how often the customer goes to provider-help websites or account management websites. For example, an account management URL could be added to the descriptions 708 cell. Account management and other information might be different for different languages 730, and descriptive information and/or configurables might be different for different geographies 706, 708, 720, 730, etc. The tables of the database provide the information needed for the referral server to intelligently refer providers and/or configurables.

It may be more efficient for a referral server to allow providers access to update provider information in the database. A referral server can provide websites for providers to update provider information. However, the referral server may filter the provider entered information for offensiveness and/or verify technical claims of a provider by testing. Additionally, testing of technical content such as added TLDs can be used to insure that providers actually deliver services offered. Testing can be a bar to entry into the referral program, and can be provided as configurables and/or configurable versions are updated. Test passage can be required to manage a positive user experience. For example, a new configurable added to the system can be tested by making a mock automated user run through the new functionality.

Identify, Rank, and Audit Domain Service Providers

A referral service searches a referral database of available providers and identifies a list of suitable providers based on geographical location and desired TLD. The referral service may also monitor/audit referred customers experience with providers. Providers are ranked based upon audited results of the purchase process for referred customer.

A database helps manage information about which providers can transact business within certain geographies, and within a geography, which configurables are offered by which providers. In one example, a company can sell domain names to customers in the US, Australia, and China. Within the US, the company can offer .com, and .cn, within China, the company can offer .com and .cn, and within Australia, the company can offer .com, .cn, and .au.

Additionally, providers may offer plans and services differently across geographies. Within a given geography, providers will offer localized assistance in multiple languages. For example, a first provider may display a different icon, and host a different landing page for customers in France (e.g., godaddy.fr vs. godaddy.com). Offering plans and services across geographies also provides reselling or branding opportunities for large well known companies that do not themselves provide certain services, but instead enter into contracts with others who do provide the services. These relationships are often synergistic since more sales often flow to an otherwise unknown company.

Additionally, a provider may localize their text to multiple languages within a given geography. For example, in France, a provider may offer both French and English strings. A provider will likely choose English descriptions for the majority of markets, and offer localized descriptions within some target select markets. For example, GoDaddy offers English text and landing pages for all locations, except for Germany and the Netherlands, where they already have market success.

The database design of FIG. 7 can be updated with more data as the new features are supported, and data can be removed from the database with a minimum of disruption. Further, this database design is for domain name services sold by providers worldwide. A database design for another configurable such as printers would include information about printer models and software drivers instead of TLDs and DNS servers. In another example, a database design for another configurables, such as VOIP would include information such as customer OS, ports for plugging in the telephone hardware, bandwidth availability, and/or components that share the bandwidth. Of course for a multi-industry referral server, referral accessible database(s) may contain the information for plural configurables, such as domain names, printers, and/or VOIP.

Utilizing Audit Information

In one example, the database 310 is used initially to intelligently determine and refer providers who can successfully provide configurables to a specific customer based upon computing environment. Monitoring information can be used to change the order of how providers are listed and displayed at a computer 300 upon referral, such as by ranking providers.

The database includes provider provided information. The database also includes information about which provider a customer selected. Additionally, the database also includes provider audit/monitor information. The audit/monitoring information can be used to order a list of providers referred to a customer, or to exclude a provider from the list due to poor audit results. Thus, after customer selection of a provider, details of a customer experience with a selected provider are collected to rank the provider for referral to future client computers. The auditing/monitoring can also be used to provide dynamic comparative feedback to customers, such as in a provider list.

Thus, the referral program has three types of parties participating—customers, providers, and a referral service. The referral service gathers information and provides comparative ranking among configurable providers. The comparative ranking may be customer feedback (subjective feedback) such as post experience automated surveys using a wizard or GUI at the customer's computer. The customer feedback may also be ease of purchase or configuration determined via empirical data (objective feedback) such as mean/average time to purchase, mean/average time to configure, and/or customer service inquires. A software component C1 in the computer 300 computing environment auto-reports 312 the empirical data and customer feedback to a referral server 302.

In one example, when a referral server 302 provides a list of providers to a computer 300 user 306, the list may include user experience information such as objective or subjective feedback. Additionally, providers on the returned list can be ordered according their ranking, such that a higher ranked provider is placed closer to the top of the list. The feedback itself could be presented or represented in a granular format (rating), a summary format (subjective user comments), or both. Other factors may also be considered to determine order of provider placement on the returned list, such as lowest price of a configurable and/or a fee paid by a provider to the referral service.

Thus, the referral service provides information about providers and/or configurables in response to a customer query. The referral service provides customer choices by requiring information from providers. The system monitors customer experience both subjective and objective. Providers are ranked based upon provided user experience information. The number of referrals and successful configurations can be used to enforce business terms agreed to between a referral service and a provider.

Optionally, the feedback is on-going feedback, not just initial, and it used to compare/recommend providers. A providers ranking may change based upon on-going feedback from customer's computers. The objective feedback is based on an agent 326, 324 running on computer 300 that provides on-going feedback such as DNS failures.

The feedback can be a time metric for a check out process or a time metric for a DNS service to begin referring a new domain name to the computer 300. On-going feedback is reported, such as when the domain name registration expires and the average time to renew an exiting service reported. Configuration success is monitored initially and at renewal for a DNS service or a domain name registration. In one example, on-going monitoring measures whether and how often a user 306 of the computer 300 utilizes provider server 318 account pages to manually adjust a service as opposed to automated provider server 318 adjustments.

If an IP address is changes and the new address is not reflected on the DNS server, monitoring this condition may affect ranking. Initial and on-going performance can be reported back to the referral server 302 by a software component 326 executing at the computer 300.

At the referral server 302, initial and/or on-going feedback may be weighted differently based upon importance when determining provider rankings. There is objective feedback, subjective feedback, initial feedback, on-going feedback, and various business considerations can be used to order providers on a list provided to customers and/or enforce business terms and/or conditions between the provider and the referral service, such as performance expectations, referral fees, etc. The database includes provider given data, automatic monitored data, and/or customer active ratings. Information is collected from providers. A customer's needs, and optionally, other automatically discovered customer computing environment data and/or technical requirements are used to respond with a list of providers. Customer experience information is used to rank providers in subsequent requests. Ranking can include an order of placement on a returned list, and/or provider relative numerical ratings that a customer can view and use to determine experiences of plural previous customers. And, the referral server 302 may present providers out of order with or without their associated rankings based upon other factors, such as referral fees, payment for list placement, advertising fees, etc.

In one example, a formula is used to determine the order that providers are listed in a referral to a customer. In one example, the formula includes at least one of the following factors: an entry fee, per client fees, revenue share per customer, flat fee per customer, fees based on services sold, fees based upon on-going revenue, subjective feedback, objective feedback, mean/average time to purchase/lease, DNS listing time or objective/subjective, and/or a time-value formula. A time-value formula rates importance of new data versus old data. In other words, old data of poor performance may be time discounted so a factor is more heavily weighted for improving data/conditions. Additionally, a ranking or factor used in ranking can vary for a provider across geographic locations. In such an example, a provider ranking is determined on a per geography basis. Thus, a provider may have a high ranking in an established geography such as Germany, but may be performing poorly in a newly entered marker, such as France. Additionally, a ranking override can be offered for high list placement to a provider, for a single or multiple geographies. In one example, a provider buys the top spot for six months despite their ranking.

Provider Entry

A referral service allows providers to join the program and offer configurables via the referral server(s). In one such example, the referral service sets minimum business standards before a provider is allowed entry. In another example, the referral service sets minimum performance standards that a provider must maintain to continue as a provider. A provider can be charged a flat fee to participate or a periodic fee to continue to participate, or a fee per geography per period such as annual or monthly fees per market. Providers may also be charged based upon each successful configuration, based upon revenue sharing for some or all of the services, based upon each referral, based upon each configurable purchased, based upon revenue share with initial minimum, and/or based upon on-going revenue share.

Provider Managed Data

Optionally, a provider server 332 has access to change descriptive data about the configurables the provider server 332 offers. The provider server 332 can change the markets where they offer configurables, and/or change what they offer in one or more markets. In such an example, the provider may be able to edit some of their provider data but not all of it. For example, a provider will be allowed to change a primary or secondary contact, but not their ranking data. A change to description data may require legal or editorial review. A change to configurables offered, or the market where offered may require technical verification or review. A referral server 302 may provide a software component 328 or Extranet account to the provider for making changes.

Web Service Definition

FIGS. 8A-8J shows a web service schema that defines an exemplary message passing protocol between a client computer(s) and a referral server. In this example, the client computer is a server and the referral server is referring plural providers of DNS services.

A first message request is the "GetCountryData" 802 message and the message response is the "GetCountryDataResponse" 804 response. Thus, the client computer sends a message 802 indicating their calling country 806 and the referral server responds 804 with the TLDs, the currencies, and the languages 808 that are supported in that country code. For example, if the client computer sends a message to the referral server indicating that the client computer is in France, the referral server could respond indicating that TLDs supported are .com, .edu, and .fr, the currency supported is the Euro, and the languages supported are French, English, and German.

A second message request is "GetMarketOffers" 810 and the referral server response message is "GetMarketOffersResponse" 812. The client computer sends a request message 810 CultureName 814 (such as en.us, fr.fr, en.ca, en.uk, etc.), and the referral server responds with a message 812 indicating an array (list) of registrars (providers) and offers 816. The returned list includes for each such registrar 818, the registrar name, the registrar description, the registrar icon, the registrar configuration URL, and a registrar service URL, as well as an offer 820 including an offer code, a purchase URL, a TLD, a currency type, and a description.

A third message request is "AuditRegistrarSelection" 822 and the referral server response message is "AuditRegistrarSelectionResponse" 824. The client computer sends an audit reporting message 822 indicating which registrar was selected and what list position they were in when selected 826 and the referral sever merely acknowledges the response 824.

A fourth message request is "AuditInitialPurchase" 828 and the referral server response message is "AuditInitialPurchaseResponse" 824. The client computer sends an audit reporting message 832 indicating which registrar the client computer used to purchase the domain name, as well as the TLD type purchased and an indication of purchase success 832, and the referral sever merely acknowledges the response 830.

A fifth message request is "AuditInitialConfig" 834 and the referral server response message is "AuditInitialConfigResponse" 836. The client computer sends an audit reporting message 834 indicating whether or not the initial configuration was successful or not, right after the purchase, as well as the registrar name 838, and the referral sever merely acknowledges the response 836.

A sixth message request is "AuditGoingLive" 840 and the referral server response message is "AuditGoingLiveResponse" 842. The client computer sends an audit reporting message 840 indicating the time after purchase when the installed configuration was operational as well as the registrar name and the success of going live 844, and the referral sever merely acknowledges the response 842. For example, the client computer queries the DNS server with the domain name, and if the correct IP address is returned, then the configuration is a success. The client computer reports this information to the referral sever using this message 840.

A seventh message request is "AuditDnsConfigFailure" 846 and the referral server response message is "AuditDnsConfigFailureResponse" 848. The client computer sends an audit reporting message 846 indicating a DNS failure type and a DNS failure information time, as well as the registrar name 850, and the referral sever merely acknowledges the response 848. In an on-going manner, at any point in the dynamic IP case, if the IP address changes for the server 300, the provider 318 needs to update the DNS server. At any point when there is a failure to update the DNS server, the server 300 calls this message 846 to report this information to the referral server 312.

A service contains a port to the service. A port contains bindings, and a binding contains operations. At FIG. 8J, the referral server is bound 852 to an IP address which is the referral service IP location. At FIG. 8H, the port type 854 is bound to the service and the operations are defined 856 on that port type. The operation binding defines 856 what data flows in and what data flows out. At FIG. 8E, the message definitions 858 define which messages flow out and which messages flow in.

Various messages are described that are reporting/sharing information from a client computer to the referral server, and these messages are reported automatically without requiring user interface participation at the client computer. Optionally, depending on geographical legal considerations and/or referral service company policy, permission from a customer (e.g., client computer user, server owner, etc.) at the client computer may be queried graphically to enable/approve this automatic message reporting. This graphical approval may be a one time approval, or an on-going per message query.

This automatic reporting of information without requiring user interface participation provides information to the referral server that is used to intelligently select providers based on the specific information obtained automatically from the client computer. This automatic reporting of information without requiring user interface participation also provides information to the referral server about initial and on-going configurations and/or failures of existing configurations. This objectively and automatically reported user experience information can be used to rank provider performance or maintain the quality of approved provider configurables.

General Framework Providing Internet Based Services to On-Premise Servers

Establishing a business presence on the Internet requires the selection, purchase and configuration of a domain name. These steps can be greatly simplified during server set-up by the introduction of a structured messaging format and protocol. By utilizing a unified and common message structure, network administration is simplified when utilizing multi-vendor components. The multi-vendor list needs to be current and tailored to the geographical location of the customer's location.

A computer 300, such as an on-premise server makes use of a defined protocol message format (XML based) to greatly simplify initial set-up of the on-premise server. Many of the configuration stages can be automated—making on-premise server 300 set-up easier for a user 306. An on-premise server 300 component 326 communicates 312 with a referral server 302, to obtain a list of one or more providers. The technology provides a three party component system utilizing (1) a customer at a server 300, (2) a company providing an intelligent referral server 302, and (3) providers 304 providing configurables.

One or more well defined protocols (e.g., WSDL(s)) are standardized to simply set-up configuration and maintenance of DNS services on remote machines. The protocol is utilized by networked devices (stand alone routers, windows servers, and/or DNS servers) to allow simplified configuration, such as during OS installation of an on-premise server. A WSDL provides a programmatic means to remotely configure and maintain DNS services.

Computing Environment

Figure 9:
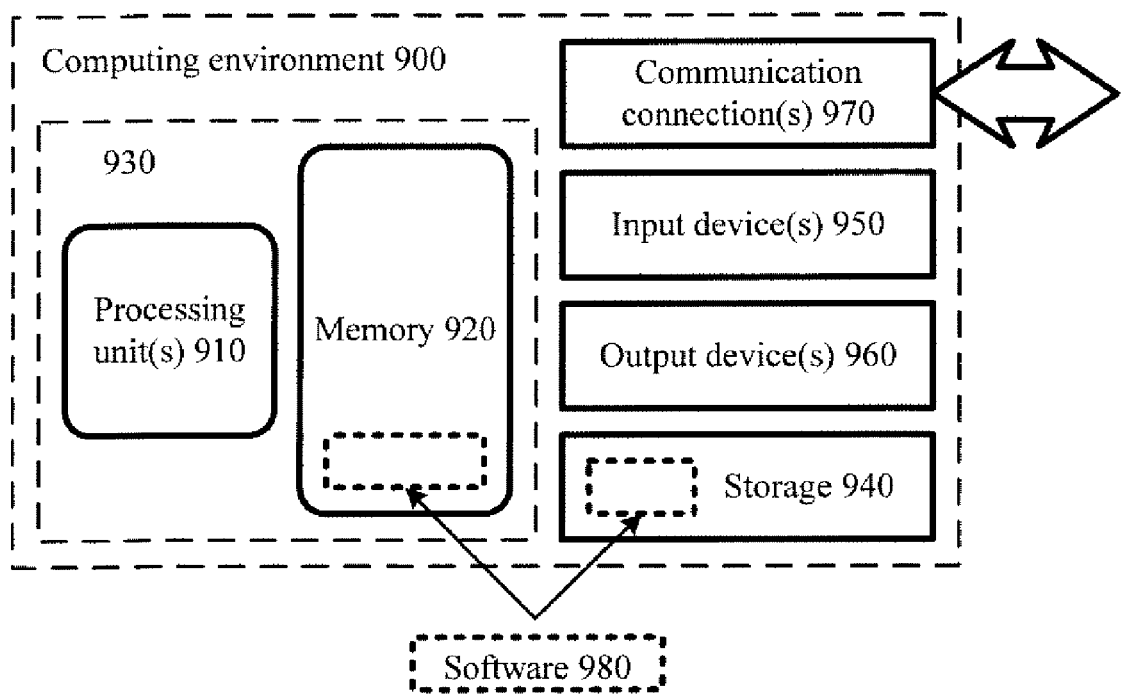
FIG. 9 is a block diagram of a distributed computer system implementing the described technologies.

FIG. 9 illustrates a generalized example of a suitable computing environment 900 in which a client computer 300, a referral server 302, a provider server 318, and or a database 310 may be implemented. One or more storage arrays may be used to store provider information depending on the size of the database 310. The computing environment 900 is not intended to suggest any limitation as to scope of use or functionality, as described embodiments may be implemented in diverse general-purpose or special-purpose computing environments.

With reference to FIG. 9, the computing environment 900 includes at least one processing unit 910 and memory 920. In FIG. 9, this most basic configuration 930 is included within a dashed line. The processing unit 910 executes computer-executable instructions and may be a real or a virtual processor. In a multi-processing system, multiple processing units execute computer-executable instructions to increase processing power. The memory 920 may be volatile memory (e.g., registers, cache, RAM), non-volatile memory (e.g., ROM, EEPROM, flash memory), or some combination of the two. The memory 920 stores software 980 implementing one or more of the described embodiments.

A computing environment may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for software executing in the computing environment 900 and coordinates activities of the components of the computing environment 900.

The storage 940 may be removable or non-removable, and includes magnetic disks, magnetic tapes or cassettes, CDs, DVDs, or any other medium which can be used to store information and which can be accessed within the computing environment 900. The storage 940 stores instructions for the software 980.

The input device(s) 950 may be a touch input device such as a keyboard, mouse, pen, touchscreen or trackball, a voice input device, a scanning device, or another device that provides input to the computing environment 900. For audio or video, the input device(s) 950 may be a microphone, sound card, video card, TV tuner card, or similar device that accepts audio or video input in analog or digital form, or a CD or DVD that reads audio or video samples into the computing environment. The output device(s) 960 may be a display, printer, speaker, CD/DVD-writer, network adapter, or another device that provides output from the computing environment 900.

The communication connection(s) 970 enable communication over a communication medium, such as a network, to one or more other computing entities, such as referral server(s) 102, provider server(s) 114, or client computers(s) 100. The communication medium conveys information such as computer-executable instructions or other data in a data signal. By way of example, and not limitation, communication media 312, 314, 316 include wired or wireless techniques implemented with an electrical, optical, RF, infrared, acoustic, or other carrier.

Embodiments can be described in the general context of computer-readable media. Computer-readable media are any available media that can be accessed within a computing environment. By way of example, and not limitation, with the computing environment 900, computer-readable media include memory 920, storage 940, communication media, and combinations of any of the above.

Embodiments can be described in the general context of computer-executable instructions, such as those included in program modules, being executed in a computing environment on a target real or virtual processor. Generally, software includes program modules, routines, programs, libraries, objects, classes, components, data structures, etc. that perform particular tasks or implement particular data types. The functionality of the program modules may be combined or split between program modules as desired in various embodiments. Computer-executable instructions for program modules may be executed within a local or distributed computing environment.

For the sake of presentation, the detailed description uses terms like "determine," "receive," and "perform" to describe computer operations in a computing environment. These terms are high-level abstractions for operations performed by a computer, and should not be confused with acts performed by a human being. The actual computer operations corresponding to these terms vary depending on implementation.

Alternatives

Having described and illustrated the principles of our invention with reference to illustrated examples, it will be recognized that the examples can be modified in arrangement and detail without departing from such principles. Additionally, as will be apparent to ordinary computer scientists, portions of the examples or complete examples can be combined with other portions of other examples in whole or in part. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa. Techniques from one example can be incorporated into any of the other examples.

In view of the many possible embodiments to which the principles of our invention may be applied, it should be recognized that the details are illustrative only and should not be taken as limiting the scope of our invention. Rather, we claim as our invention all such embodiments as may come within the scope and spirit of the following claims and equivalents thereto.

We claim:

1. A method comprising:
communicating with a referral server to identify information associated with a computer's computing environment and to identify configurables available to the computer based on the identified computing environment information that includes the computer's geographic location and at least one other factor, wherein the computer communicates a geographic location identifier of the computer's location and an identifier of at least one other factor;
communicating with the referral server to receive a list of provider servers selected by the referral server for referring to the computer, where the provider servers are included in the list because of their ability to auto-configure configurables in the computer's geographic location according to the at least one other factor; and
receiving, at the computer, a configuration software component determined based at least on the geographic location identifier and the identifier of at least one other factor, the configuration software component configured for purchasing of a selected configurable and auto-configuration of the computer's computing environment to operate the selected configurable;
communicating, using the received configuration software component, with a provider server selected from the list of provider servers to purchase the selected configurable and to auto-configure the computer's computing environment to operate the selected configurable.

2. The method of claim 1 further comprising communicating with the referral server to provide a metric about the provider server's performance.

3. The method of claim 1 wherein the at least one other factor comprises a top level domain.

4. The method of claim 1 wherein the at least one other factor comprises: a human language, an operating system, a hardware port, a globally unique identifier of software, a globally unique identifier of hardware, or a bandwidth quantifier.

5. The method of claim 1 wherein the selected configurables include shipped hardware and software downloaded to the computer during auto-configuration.

6. The method of claim 1 wherein communicating with the provider server further comprises communicating to purchase a second selected configurable and auto-configuring the computer's computing environment to operate the second selected configurable.

7. The method of claim 1 wherein communicating with the referral server to identify configurables further comprises a request for a specific good.

8. The method of claim 1 wherein communicating with the referral server to identify configurables further comprises a request for a specific service.

9. The method of claim 1 wherein communicating with the referral server to identify configurables comprises a request to identify any configurables available specifically to the computer based upon the computer's geographic location and a technical requirement specified by the identifier of the at least one other factor.

10. The method of claim 1, wherein a technical requirement specified by the identifier of the at least one other factor is obtained from a user via interaction with a GUI while the geographic identifier of the computer's geographic location is obtained from system information in the computer's memory.

11. The method of claim 1 wherein communicating with the provider server comprises communicating according to a web service definition obtained from the referral server.

12. The method of claim 1 wherein communicating with the referral server further comprises communicating a post auto-configure audit report.

13. A computer system comprising:
   computer memory and a central processing unit; and
   the computer memory having software comprising:
      software for communicating with a referral server to identify configurables available to the computer system based on a geographic location of the computer system and at least one other factor, wherein the computer system communicates to the referral server at least a geographic identifier of the geographic location and an identifier of the at least one other factor;
      software for communicating with the referral server to receive a list of provider servers selected by the referral server for referring to the computer system where provider servers are included in the list because of their ability to auto-configure configurables for the geographic location and for the at least one other factor;
      software determined based at least on the geographic location identifier and the identifier of at least one other factor configured for communicating with a provider server selected from the list to purchase a selected configurable and to auto-configure the computer system's computing environment to operate the selected configurable; and
      software for communicating with the referral server to provide initial and on-going audit information about the provider server's performance.

14. The computer system of claim 13 wherein the computer system obtains software from the referral server for communicating with the provider server.

15. The computer system of claim 13, wherein the geographic identifier is obtained from computer memory while other information is obtained from a user of the computer system via a GUI.

16. The computer system of claim 13 wherein communicating with the referral server and communicating with the provider server comprises communicating according to web service definitions.

17. A computer readable medium having thereon, computer-executable instructions comprising:
   instructions for communicating with a referral server to identify services available to a computer based on a geographic location identifier of the computer and an identifier of at least one other factor;
   instructions for communicating with the referral server to receive a list of provider servers selected by the referral server for referring to the computer because the provider servers on the list auto-configure services for computers within a geography determined by the geographic location identifier;
   instructions for receiving a software component determined based at least on the geographic location identifier and the identifier of the at least one other factor, the configuration software component configured for communicating with a provider server selected from the list to purchase a selected service and to auto-configure the computer's computing environment to operate the selected service; and
   instructions for communicating with the referral server to provide initial and on-going audit information about the selected service.

18. The computer readable medium of claim 17, wherein plural provider servers on the list auto-configure plural services comprising at least two of: DNS services, video-on-demand, voice-over-internet-protocol, or network storage.

19. The computer readable medium of claim 17, wherein the list of provider servers further comprise a comparative ranking of providers based on audit information received from previous customer's within the geography.

* * * * *